United States Patent [19]
Hoshi

[11] Patent Number: 6,151,890
[45] Date of Patent: Nov. 28, 2000

[54] EXHAUST GAS PURIFYING APPARATUS FOR AN INTERNAL COMBUSTION ENGINE

[75] Inventor: Koich Hoshi, Susono, Japan

[73] Assignee: Toyota Jidosha Kabushiki Kaisha, Toyota, Japan

[21] Appl. No.: 09/064,060

[22] Filed: Apr. 22, 1998

[30] Foreign Application Priority Data

Apr. 30, 1997 [JP] Japan .................................. 9-113209

[51] Int. Cl.[7] .................................................. F01N 3/00
[52] U.S. Cl. ............................. 60/297; 60/295; 60/285; 60/286; 60/289; 60/303
[58] Field of Search ........................... 60/297, 295, 285, 60/276, 286, 300, 303, 289, 284; 123/406.44, 406.45

[56] References Cited

U.S. PATENT DOCUMENTS

| | | | |
|---|---|---|---|
| 5,233,831 | 8/1993 | Hitomi et al. | 60/284 |
| 5,388,402 | 2/1995 | Aoki et al. | 60/276 |
| 5,553,451 | 9/1996 | Harada | 60/277 |
| 5,647,203 | 7/1997 | Abe et al. | |
| 5,655,362 | 8/1997 | Kawajiri et al. | 60/276 |
| 5,657,625 | 8/1997 | Koga et al. | 60/274 |
| 5,758,493 | 6/1998 | Asik et al. | 60/274 |
| 5,802,845 | 9/1998 | Abe et al. | 60/274 |

FOREIGN PATENT DOCUMENTS

| | | |
|---|---|---|
| 4-105925 U | 9/1992 | Japan . |
| 5-18236 | 1/1993 | Japan . |
| 5-79319 | 3/1993 | Japan . |
| 5-187228 | 7/1993 | Japan . |
| 6-33747 | 2/1994 | Japan . |
| 6-93849 | 4/1994 | Japan . |
| 6-212960 | 8/1994 | Japan . |
| 6-336915 | 12/1994 | Japan . |
| 7-91236 | 4/1995 | Japan . |
| 7-91296 | 4/1995 | Japan . |
| 7-139343 | 5/1995 | Japan . |

*Primary Examiner*—Thomas Denion
*Assistant Examiner*—Binh Tran
*Attorney, Agent, or Firm*—Oliff & Berridge, PLC

[57] ABSTRACT

An unburnt gas component such as unburned hydrocarbon (HC) discharged from an internal combustion engine irrespective of an amount of exhaust gas is purified without fail. The unburnt gas component is prevented from being discharged into the atmosphere. In order to attain this, an exhaust gas purifying apparatus for an internal combustion engine according to the present invention is provided with a plurality of exhaust passages connected to the internal combustion engine; a joint exhaust passage formed by merging the exhaust passages; an exhaust gas purifying unit for purifying the exhaust gas that flows through the joint exhaust passage; an adsorption/desorption unit provided in each of the exhaust passages for adsorbing an unburnt gas component contained in the exhaust gas that flows through each of the exhaust passages at a temperature lower than a predetermined temperature and for desorbing the adsorbed unburnt gas component at a temperature equal to or higher than the predetermined temperature; and a desorption/adjustment unit for differentiating timings for desorbing the unburnt gas component by the adsorption/desorption unit.

23 Claims, 17 Drawing Sheets

EXHAUST GAS PURIFYING APPARATUS FOR AN INTERNAL COMBUSTION ENGINE

BACKGROUND OF THE INVENTION

1. Field of the Invention

The present invention relates to exhaust gas purifying apparatus for purifying exhaust gas discharged from an internal combustion engine.

2. Description of the Related Art

In an internal combustion engine mounted on an automotive vehicle or the like, it is necessary to purify discharged exhaust gas such as components of, for example, carbon monoxide (CO), nitrogen oxide (NOx), hydrocarbon (HC) and the like before being discharged into the atmosphere.

In particular, it is important to purify the unburnt gas components discharged in starting the internal combustion engine. In this case, in starting the internal combustion engine, an air/fuel ratio of mixture is set at a low air/fuel ratio (on an enriched side) in comparison with a stoichiometric air/fuel ratio in order to enhance startability of the internal combustion engine. However, since the temperature of the internal combustion engine is low and the combustion is unstable, a large amount of the unburnt gas components such as the unburnt hydrocarbon is discharged.

To meet this demand, an "engine exhaust gas purifying apparatus" described in Japanese Patent Application Laid-Open No. Hei 6-33747 is well known. In this apparatus, an adsorbent for adsorbing unburnt hydrocarbon (HC) contained in the exhaust gas below a predetermined temperature and for releasing the adsorbed unburnt hydrocarbon (HC) at a temperature equal to or higher than the predetermined temperature, is provided at an exhaust passage upstream of an exhaust gas purifying catalyst, and a heated catalyst is provided in the exhaust passage between the adsorbent and the catalyst.

In such an exhaust gas purifying apparatus, in the case where the engine is started in a cold condition so that the catalyst is kept under an inactive condition, the unburnt hydrocarbon (HC) discharged in starting the engine is adsorbed onto the adsorbent and current is fed to a heater of the heated catalyst to thereby activate the catalyst.

Thereafter, when the adsorbent is subjected to heat of the exhaust gas to reach a predetermined temperature, the unburnt hydrocarbon (HC) adsorbed on the adsorbent is released away from the adsorbent and is caused to flow into the heated catalyst. However, at this time, since the heated catalyst is activated by the heater, the above-described unburnt hydrocarbon (HC) is purified by the heated catalyst.

However, in the case where the above described exhaust gas purifying apparatus is applied to an internal combustion engine having a large displacement capacity, since a large amount of unburnt hydrocarbon (HC) is adsorbed on the adsorbent in starting the internal combustion engine, the large amount of unburnt hydrocarbon (HC) adsorbed on the adsorbent when a temperature of the adsorbent is elevated at a predetermined temperature is caused to enter into the heated catalyst at once. As a result, there is a possibility that the unburnt hydrocarbon would be discharged into the atmosphere without completely purifying the exhaust gas through the heated catalyst.

SUMMARY OF THE INVENTION

In view of the above-described drawbacks, an object of the present invention is to provide a technology for purifying, without fail, an unburnt gas component such as unburnt hydrocarbon (HC) discharged from an internal combustion engine irrespective of a magnitude of the amount of exhaust gas, and to prevent the unburnt gas component from being discharged into the atmosphere.

In order to solve the above-described drawbacks, the present invention adopts the following structure:

Namely, an exhaust gas purifying apparatus for an internal combustion engine according to the present invention comprises: a plurality of exhaust passages connected to a multi-cylinder internal combustion engine; a joint exhaust passage formed by merging the exhaust passages; an exhaust gas purifying means for purifying exhaust gas that flows through the joint exhaust passage; an adsorption/desorption means provided in each of the exhaust passages for adsorbing an unburnt gas component contained in the exhaust gas that flows through each of the exhaust passages at a temperature lower than a predetermined temperature and for desorbing the adsorbed unburnt gas component at a temperature equal to or higher than the predetermined temperature; and a desorption/adjustment means for differentiating timings for the unburnt gas components, which have been desorbed from the respective adsorption/desorption means, to enter into the exhaust gas purifying means.

In such an exhaust gas purifying apparatus for an internal combustion engine, in the case where the above-described exhaust gas purifying means is in the non-active condition and the above-described adsorption/desorption means is kept below the predetermined temperature like the case where the internal combustion engine is started in a cold condition, the exhaust gas from the above-described internal combustion engine is introduced into the respective adsorption/desorption means through the exhaust passages and the unburnt gas components contained in the exhaust gas are adsorbed to the respective adsorption/desorption means.

Then, the exhaust gas discharged from the respective adsorption/desorption means is introduced into the joint exhaust passage through the above-described exhaust passage and subsequently introduced into the exhaust gas purifying means. In this case, the exhaust purifying means is in the non-activated condition, and it is impossible to sufficiently purify the unburnt gas components contained in the exhaust gas. However, since the exhaust gas to be introduced into the above-described exhaust gas purifying means is deprived of the unburnt gas components by the above-described adsorption/desorption means, the unburnt gas components would not be discharged into the atmosphere.

Thereafter, the respective adsorption/desorption means received the heat of the exhaust gas to be elevated to a predetermined temperature to desorb the adsorbed unburnt gas component. At this time, the desorption/adjustment means differentiates timings for the unburnt gas components, which have been desorbed from the respective adsorption/desorption means, to enter into the exhaust gas purifying means, namely, the unburnt gas component from one of the adsorption/desorption means enters the exhaust gas purifying means, and, thereafter, the unburnt gas component from the other adsorption/desorption means enters the exhaust gas purifying means.

As a result, entering of all the unburnt gas components which have been desorbed from the adsorption/desorption means, together into the exhaust gas purifying means is prevented. Accordingly, according to the present invention, even if the amount of the exhaust gas is large, it is possible to purify, without fail, the unburnt gas components without increasing the performance of or enlarging the exhaust purifying means. It is possible to prevent the emission from being degraded.

In the exhaust gas purifying apparatus for an internal combustion engine as described above, the adsorption/desorption means may comprise a three way catalyst. In general, the three way catalyst is formed by constituting the porous catalyst layer on the carrier surface. Then, since, when the exhaust gas temperature is low as in the starting operation of the internal combustion engine, the unburnt gas component is in the liquefied state, if the three way catalyst is less than the predetermined temperature, the unburnt gas component is adhered to the interior of holes of the catalyst layer in the liquefied state. After that, the temperature of the three way catalyst is elevated at a predetermined temperature, the unburnt gas component that has been adhered to the interior of holes is gasified and released away from holes. Thus, the three way catalyst may be used as the adsorption/desorption means for effecting the adsorption and the desorption of the unburnt gas component. For the adsorption/desorption means, an adsorbent including a zeolite may also be used.

For the exhaust gas purifying means, a heated catalyst or a three-way catalyst may be used.

The desorption/adjustment means may differentiate timings of each of said adsorption/desorption means to desorb the unburnt gas components therefrom. In this case, timings of desorbing the unburnt gas components from respective adsorption/desorption means are different, namely, the unburnt gas component desorbed from one of the adsorption/desorption means enters into the exhaust gas purifying means, and, thereafter, the unburnt gas component desorbed from the other adsorption/desorption means enters into the exhaust gas purifying means. Thus, entering of all the unburnt gas components which have been desorbed from all adsorption/desorption means together into the exhaust gas purifying means is prevented.

The desorption/adjustment means may differentiate the temperatures of the exhaust gas introduced in the adsorption/desorption means of each of the exhaust passages. Since the adsorption/desorption means receives the heat of the exhaust gas and the temperature thereof is elevated, the temperatures of the exhaust gas introduced into the respective adsorption/desorption means are differentiated from each other, so that it is possible to differentiate time periods for raising temperatures of adsorption/desorption means to reach the predetermined temperature, respectively.

As a method for thus differentiating the temperatures of the exhaust gas introduced into the respective adsorption/desorption means, it is possible to exemplify a method for differentiating the distances between the adsorption/desorption means and the internal combustion engine for every adsorption/desorption means. In this case, as the distance to the internal combustion engine is shorter, the adsorption/desorption means will be exposed to the higher temperature of the exhaust gas. Accordingly, the time needed to elevate it to the predetermined temperature becomes shorter.

As a result, in order from the adsorption/desorption means having the minimum distance to the internal combustion engine, the adsorption/desorption means reaches the predetermined temperature and desorbs the unburnt gas component.

As a method for differentiating the temperatures of the exhaust gas introduced into the respective adsorption/desorption means, it is possible to exemplify a method for differentiating the ignition timings of the cylinders to which the respective exhaust passages are connected to thereby differentiate the temperatures of the exhaust gas to be introduced into the respective exhaust passages. In this case, since in the cylinder having the later ignition timing, the combustion is performed at the later stage in comparison with the cylinders having the earlier timings, the temperature of the combustion gas within the cylinder is high in the opening of the exhaust valve.

As a result, the exhaust gas discharged from the cylinder having the later ignition timing is kept at a higher temperature than the exhaust gas discharged from the cylinder having the earlier ignition timing. Then, the adsorption/desorption means of the exhaust passage connected to the cylinder having the later ignition timing is exposed to the exhaust gas having a higher temperature than the adsorption/desorption means of the exhaust passage connected to the cylinder having the earlier ignition timing and reaches the predetermined temperature earlier.

As another method for differentiating the temperatures of the exhaust gas discharged from the respective cylinders, it is possible to exemplify a method for differentiating the valve opening timings of the exhaust valves of the cylinders connected to the respective exhaust passages. Since the temperature of the burnt gas in each cylinder is lowered when time lapses, the cylinder whose exhaust valve is opened in an earlier stage discharges the combustion gas kept at a higher temperature than that of the cylinder whose exhaust valve is opened in the later stage. Namely, the exhaust gas having a higher temperature than that of the exhaust passage connected to the cylinder whose exhaust valve is opened in the later stage is caused to flow through the exhaust passage connected to the cylinder whose exhaust valve is opened in the earlier stage.

As another method for differentiating the temperatures of the exhaust gas discharged from the respective cylinders, it is possible to exemplify a method for differentiating the combustion speeds of mixture of the respective cylinders. The lower the combustion speed, the higher the temperature of the combustion gas in the valve opening of the exhaust valve will become. Accordingly, the cylinder having the low combustion speed discharges the combustion gas having the higher temperature than the cylinder having the higher combustion speed. Namely, the higher temperature exhaust gas than the exhaust passage connected to the cylinder having the high combustion speed is caused to flow through the exhaust passage connected to the low combustion speed cylinder.

As another method for differentiating the temperatures of the exhaust gas discharged from the respective cylinders, it is possible to exemplify a method for differentiating the air/fuel ratios of mixture of the respective cylinders. The higher the air/fuel ratios of the mixture, the higher the combustion temperature will become. Accordingly, the higher temperature combustion gas is discharged from the cylinder in which the high air/fuel ratio mixture (lean atmosphere mixture) is burnt than the cylinder in which the low air/fuel ratio mixture (enriched atmosphere mixture) is burnt. Namely, the higher temperature exhaust gas is caused to flow through the exhaust passage connected to the cylinder in which the lean atmosphere mixture is burnt than the exhaust passage connected to the cylinder in which the rich atmosphere mixture is burnt.

As a method to differentiating the time needed for elevate the temperature of the respective adsorption/desorption means to a predetermined temperature, it is possible to exemplify a method for differentiating the air amounts sucked to the cylinders connected to the respective exhaust passages. Since a large amount of the exhaust gas is discharged from the cylinder having a large amount of intake air amount in comparison with the cylinder having a small intake air amount, the larger amount of the exhaust gas is caused to flow through the exhaust passage connected to the cylinder having the large amount intake air amount than the exhaust passage connected to the cylinder having the small amount intake air amount.

As a result, the adsorption/desorption means of the exhaust passage connected to the cylinder having the large intake air amount is exposed to the larger amount of the exhaust gas than the adsorption/desorption means of the exhaust passage connected to the cylinder having the small intake air amount and reaches the predetermined temperature earlier.

As a method for differentiating the temperatures of the exhaust gas introduced into the respective adsorption/desorption means, it is possible to exemplify a method for differentiating heat capacities of the respective exhaust passages. Since the exhaust passage having a large heat capacity adsorbs the larger amount of the heat than the exhaust passage having a small heat capacity, the exhaust gas flowing through the exhaust passage having the large heat capacity is more deprived of the heat than the exhaust gas flowing through the exhaust passage having the small heat capacity and the temperature when the exhaust gas enters the adsorption/desorption means becomes low.

In the case where the exhaust gas temperatures introduced into the respective adsorption/desorption means are differentiated from each other by the above-described method, it is possible to differentiate the time period for raising temperatures of adsorption/desorption means to reach the predetermined temperature respectively. Even in the case where the adsorption/desorption means having the same function are used, it is possible to differentiate the timings of desorption of the unburnt gas component in the respective adsorption/desorption means.

As a method for differentiating the desorption timings of the respective adsorption/desorption means, it is possible to exemplify a method for differentiating the heat capacities of the respective adsorption/desorption means. The adsorption/desorption means having a large heat capacity has a larger amount of heat to be adsorbed in comparison with the adsorption/desorption means having a small heat capacity and it takes a longer time to elevate the temperature to a predetermined temperature.

In the case where each adsorption/desorption means is provided with a carrier having a plurality of through holes in a direction of the flow of the exhaust gas, a catalyst layer formed on a surface of the carrier and an outer sleeve incorporating therein the carrier, as a method for differentiating the heat capacities of the adsorption/desorption means, it is possible to differentiate at least one selected from the factors of a thickness of a member constituting the carrier, a thickness of a member constituting the outer sleeve, a density of the through holes, a diameter of the carrier, an axial length of the carrier and a volume of the carrier for every adsorption/desorption means.

For example, in case of the two adsorption/desorption means having the same structure except for the thickness of the member constituting the carrier of the adsorption/desorption means, the adsorption/desorption means having the large thickness of the member constituting the carrier is able to adsorb a larger amount of heat than the adsorption/desorption means having the small thickness of the member constituting the carrier. As a result, it takes a longer time for raising the temperature of the adsorption/desorption means having the large thickness of the member constituting the carrier to reach the predetermined temperature in comparison with the adsorption/desorption means having the small thickness of the member constituting the carrier.

In case of the two adsorption/desorption means having the same structure except for the thickness of the member constituting the outer sleeve of the adsorption/desorption means, the adsorption/desorption means having the large thickness of the member constituting the outer sleeve is able to adsorb a larger amount of heat than the adsorption/desorption means having the small thickness of the member constituting the outer sleeve. As a result, it takes a longer time for raising the temperature of the adsorption/desorption means having the large thickness of the member constituting the outer sleeve to reach the predetermined temperature in comparison with the adsorption/desorption means having the small thickness of the member constituting the outer sleeve.

In case of the two adsorption/desorption means having the same structure except for the density of the through holes of the carrier constituting the adsorption/desorption means, i.e., the two adsorption/desorption means having the same structure except for the number of the through holes per unit area of the carrier, the adsorption/desorption means providing with the carrier having the high density of the through holes is able to adsorb a larger amount of heat than the adsorption/desorption means providing with the carrier having the low density of the through holes. As a result, it takes a longer time for raising the temperature of the adsorption/desorption means providing with the carrier having the high density of the through holes to reach the predetermined temperature in comparison with the adsorption/desorption means providing with the carrier having the low density of the through holes.

In the case where a diameter of the carrier of the adsorption/desorption means is differentiated, i.e., in case of the two adsorption/desorption means having the same structure other than the diameter of the carrier, the adsorption/desorption means having a large diameter of the carrier has a large substantial volume of the carrier in comparison with the adsorption/desorption means having the small diameter of the carrier and may have a large amount of heat to be adsorbed. As a result, it takes a longer time for raising the temperature of the adsorption/desorption means having the large diameter of the carrier to reach the predetermined temperature in comparison with the adsorption/desorption means having the small diameter of the carrier.

In the case where an axial length of the carrier of the adsorption/desorption means is differentiated, i.e., in case of the two adsorption/desorption means having the same structure other than the axial length of the carrier, the adsorption/desorption means having a long axial length of the carrier has a large substantial volume of the carrier in comparison with the adsorption/desorption means having a short axial length of the carrier and may have a large amount of heat to be adsorbed. As a result, for the adsorption/desorption means having the long axial length of the carrier, it takes a longer time until the heat is conducted to the end portion of the outlet of the adsorption/desorption means.

Therefore, it takes a longer time for raising the temperature of the adsorption/desorption means having the long axial length of the carrier to reach the predetermined temperature in comparison with the adsorption/desorption means having the short axial length of the carrier.

In the case where the volume of the carrier is differentiated, the adsorption/desorption means having a large volume of the carrier has a larger amount of heat to be adsorbed than the adsorption/desorption means having a small volume of the carrier. As a result, it takes a longer time for raising the temperature of the adsorption/desorption means having a large volume of the carrier to reach the predetermined temperature in comparison with the adsorption/desorption means having a small volume of the carrier.

As another method for differentiating the heat capacities of the adsorption/desorption means, it is possible to exemplify a method for differentiating at least one of material of the member constituting the carrier, an amount of the catalyst substance and an amount of the catalyst layer for every adsorption/desorption means.

For example, in the case where the material constituting the carrier is material having a large heat capacity and material having a small heat capacity, the adsorption/desorption means having the carrier made of the large heat capacity material is able to adsorb a larger amount of heat than the adsorption/desorption means having the carrier made of the small heat capacity material. As a result, it takes longer time for raising the temperature of the adsorption/desorption means having the carrier made of the large heat capacity material to reach the predetermined temperature in comparison with the adsorption/desorption means having the carrier made of the small heat capacity material.

In the case where the amount of the catalyst material carried on the carrier is differentiated, the adsorption/desorption means having the large amount of catalyst substance on the carrier has a substantially larger heat capacity than the adsorption/desorption means having the small amount of catalyst substance on the carrier.

In the case where the amount of the catalyst layer is differentiated, the adsorption/desorption means having the large amount of the catalyst layer has a substantially larger heat capacity than the adsorption/desorption means having the small amount of the catalyst layer.

In the case where the heat capacity is differentiated for the respective adsorption/desorption means by the above-described methods, since it is possible to differentiate the time for raising temperatures of adsorption/desorption means to reach the predetermined temperature respectively, it is possible to differentiate the desorption timings of the unburnt gas component in the respective adsorption/desorption means without complicating the control of the internal combustion engine.

Here the above-described exhaust passage may be a dual exhaust pipe connected to the internal combustion engine and may be exhaust pipes connected to each cylinder bank in the case of a V-shaped internal combustion engine provided with a first cylinder bank and a second cylinder bank having at least two cylinders arranged in a line.

DESCRIPTION OF THE PREFERRED EMBODIMENTS

An exhaust gas purifying apparatus for an internal combustion engine in accordance with one embodiment of the invention will now be described with reference to the accompanying drawings.

Embodiment 1

Figure 1:
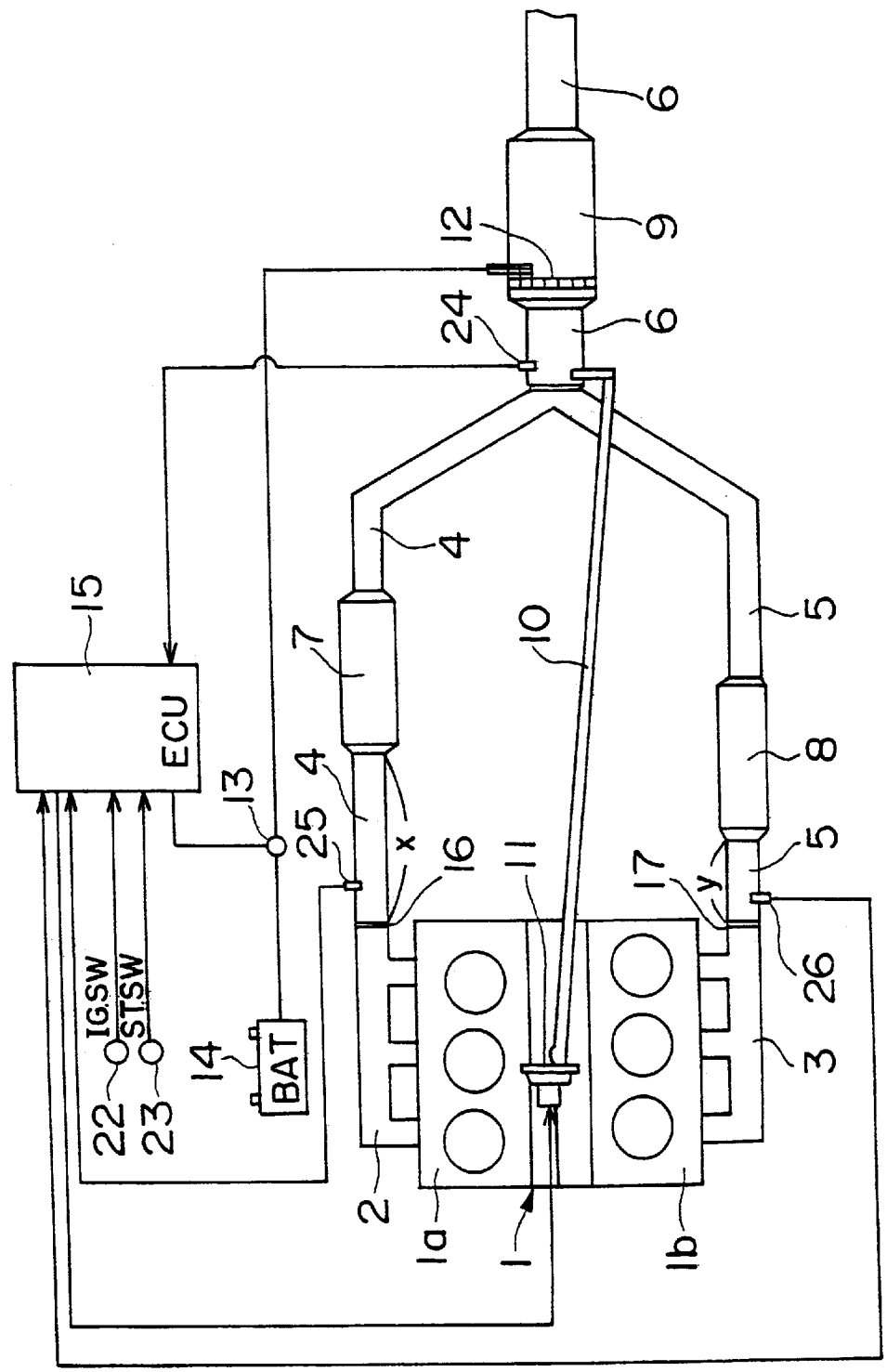
FIG. 1 is a schematic view showing a structure of an internal combustion engine and an exhaust system to which an exhaust gas purifying apparatus according to the present invention is applied.

FIG. 1 is a schematic structural view showing a structure of an internal combustion engine to which an exhaust gas purifying apparatus for an internal combustion engine in accordance with the invention is applied, and its structure of the exhaust gas system.

The above-described internal combustion engine 1 is a V-shaped engine having a multiplicity of cylinders. A first exhaust manifold 2 is connected to a bank of cylinders 1a on one side (hereinafter referred to as a first cylinder bank 1a) and a second exhaust manifold 3 is connected to a bank of cylinders 1b on the other side (hereinafter referred to as a second cylinder bank 1b). Then, the first exhaust manifold 2 is connected to a first exhaust gas pipe 4 used as a first exhaust gas passage according to the present invention, and the second exhaust manifold 3 is connected to a second exhaust gas pipe 5 used as a second exhaust gas passage according to the present invention.

Here, the first exhaust gas pipe 4 and the second exhaust gas pipe 5 take a substantially symmetrical arrangement, and are structured so that a distance from a joint portion 16 to a first cylinder bank 1a of the first exhaust manifold 2 and the first exhaust pipe 4 is equal to that from a joint portion 17 to a second cylinder bank 1b of the second exhaust manifold 3 and the second exhaust pipe 5.

Subsequently, the first exhaust pipe 4 and the second exhaust pipe 5 are merged together on the downstream side and connected to an exhaust pipe 6 as a common exhaust passage according to the present invention. A first three way catalyst 7 is disposed in the midway of the above-described first exhaust pipe 4 and a second three way catalyst 8 is disposed in the midway of the above-described second exhaust pipe 5. A distance x from the joint portion 16 to an inlet portion of the first three way catalyst 7 of the first exhaust manifold 2 and the first exhaust pipe 4 is greater than a distance y from the joint portion 17 to an inlet portion of the second three way catalyst 8 of the second exhaust manifold 3 and the second exhaust pipe 5.

Figure 2:
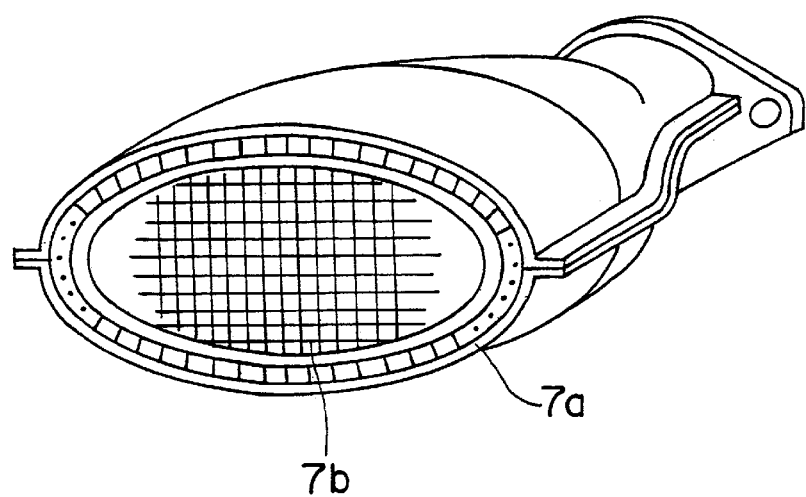
FIG. 2 is a view showing a structure of a first three way catalyst.
Figure 3:
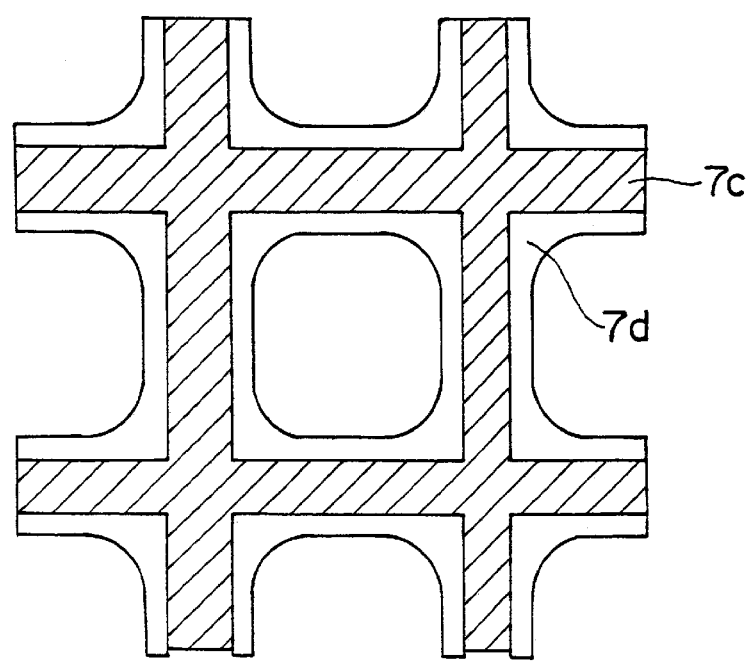
FIG. 3 is a view showing a structure of a catalyst.

Then, as shown in FIG. 2, the first three way catalyst 7 is formed by filling a cylindrical outer sleeve 7a with a monolithic type catalyst 7b having a plurality of through-holes in the flow direction of the exhaust gas. More specifically, as shown in FIG. 3, the catalyst 7b is composed of a ceramic carrier 7c made of [corgelite] formed into a lattice so as to have the through-holes in the flow direction of the exhaust gas and a catalyst layer 7d coated on a surface of the ceramic carrier 7c.

Figure 4:
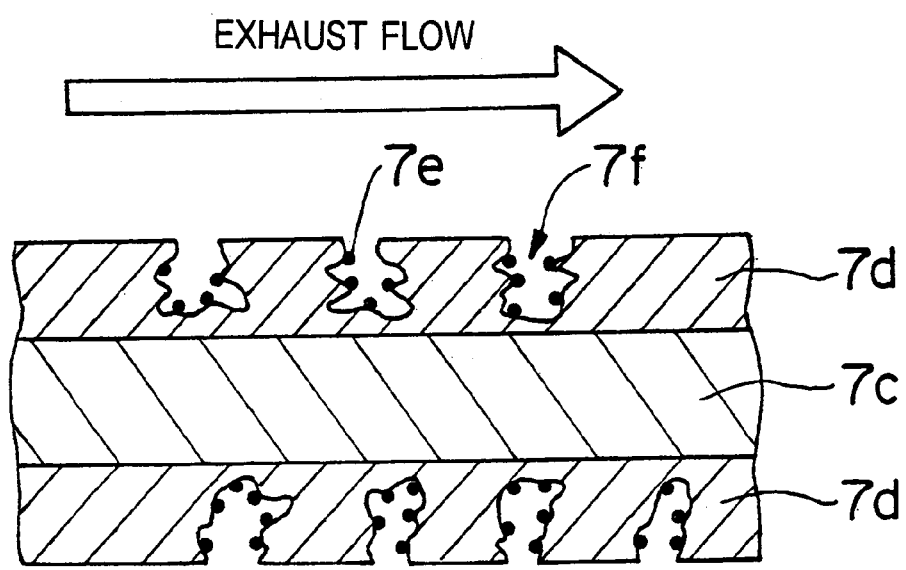
FIG. 4 is a view illustrating an adsorption performance of the first three way catalyst.

As shown in FIG. 4, the above-described catalyst layer 7d is formed by carrying a platinum-rhodium (Pt-Rh) system noble metal catalyst substance 7e on a surface of porous alumina ($Al_2O_3$) having a plurality of pores 7f.

In the thus formed first three way catalyst 7, when a temperature of the catalyst 7b is lower than a predetermined temperature, an unburnt gas component in a liquid form such as hydrocarbon (HC) included in the exhaust gas flows into the pores 7f of the catalyst 7d and adhered to wall surfaces of the pores 7f. Then, when the temperature of the catalyst 7b reaches the predetermined temperature or more, the unburnt hydrocarbon adhered within the above-described pores 7f is gasified and released from the above-described catalyst layer 7d to flow on the downstream side together with the exhaust gas. Namely, the first three way catalyst 7 realize an adsorption/desorption means according to the present invention.

Also, the above-described second three way catalyst 8 is formed in the same way as that for the first three way catalyst 7 and realizes the adsorption/desorption means according to the present invention.

Turning back to FIG. 1, a third three way catalyst 9 incorporating a heater 12 for heating by electric application is provided in the midway of the exhaust pipe 6. The above-described heater 12 is connected through a relay 13 to a battery 14 and generates heat by the current from the battery 14 when the relay 13 is turned on. The ON/OFF condition of the above-described relay 13 is switched in accordance with an electric signal from an ECU 15.

Subsequently, a secondary air feeding pipe 10 is connected to the exhaust pipe 6 upstream of the third catalyst 9 and is connected to an air pump 11. The air pump 11 is driven in accordance with an electric signal from the ECU 15 for pressurized and feeding fresh air, flowing through an intake passage downstream of the air cleaner (not shown), to the exhaust pipe 6.

Air/fuel ratio sensors 25 and 26 are mounted on the first exhaust pipe 4 upstream of the first three way catalyst 7 and on the second exhaust pipe 5 upstream of the second three way catalyst 8, respectively. Each of these air/fuel sensors 25 and 26 is composed of a solid electrolyte portion formed into a cylinder by sintering zirconia ($ZrO_2$), an outer platinum electrode covering an outer surface of the solid electrolyte portion, and an inner platinum electrode covering an inner surface of the solid electrolyte portion. The sensor is a so-called linear air/fuel sensor which outputs a current in proportion to a value an oxygen concentration of the exhaust gas (concentration of the unburnt gas component when the air/fuel ratio is more on the enrich side) in accordance with the oxygen ion movement when the voltage is applied between the above-described electrodes.

An oxygen sensor 24 for detecting an oxygen concentration of the exhaust gas flowing through the exhaust pipe 6 is mounted on the exhaust pipe 6 upstream of the third three way catalyst 9. For instance, the oxygen sensor 24 is a zirconia type sensor which outputs an electromotive force which exceeds a predetermined level in the enriched atmosphere with respect to the stoichiometric air/fuel ratio and outputs an electromotive force which is less than the predetermined level in the lean atmosphere.

Subsequently, the ECU 15 for controlling the respective above-described portions is connected to various sensors (not shown) in addition to an ignition switch sensor (IGSW) 22, a starter switch sensor (STSW) 23, the air/fuel sensor 25 and 26 and the oxygen sensors 24, and calculates an electric application timing of the heater 12, a secondary air feeding amount, a secondary air feeding timing, a fuel injection amount (a length of the fuel injection time), a fuel injection timing, an ignition timing or the like, to control the relay 13, the air pump 11 and the like in accordance with the signals from the respective sensors.

For instance, the ECU 15 starts the electric application to the heater 12 when an electric signal representative of the ON condition of the ignition switch is fed to the ECU 15 by the ignition switch sensor 22. Then, the ECU 15 calculate the current application period for the heater 12 in accordance with a map showing a relationship of a temperature and the current application period at the start of the internal combustion engine 1.

Also, the ECU 15 feeds a drive current to the air pump 11 when an electric signal representative of the ON switch of the starter switch is applied to the ECU 15 by the starter switch sensor 23.

Subsequently, the ECU 15 performs a so-called air/fuel ratio feedback control which compensates for the fuel amount injected into the respective intake ports or the respective cylinders of the first cylinder bank 1a and the second cylinder bank 1b in response to the electric signals from the respective air/fuel ratio sensors 25 and 26 and simulates the exhaust gas discharged from the first cylinder bank 1a and the second cylinder bank 1b to an air/fuel ratio at which the first three way catalyst 7 and the second three way catalyst 8 effectively work.

Furthermore, the ECU 15 detects the oxygen concentration downstream of the first and second three way catalysts 7 and 8 and compensates for the control amount of the air/fuel ratio feedback control by the air/fuel ratio sensors 25 and 26 so that the air/fuel ratio of the exhaust gas introduced into the first and second three way catalysts 7 and 8.

<Operation and Advantage of First Embodiment>

The operation and advantage of the exhaust gas purifying apparatus for an internal combustion engine in accordance with the embodiment will now be described.

When the electric signal representative of the ON condition of the ignition switch is inputted into the ECU 15 by the ignition switch sensor 22, the ECU 15 switches the relay 13 from the OFF condition to the ON condition and applies the current from the battery 14 to the heater 12 of the third three way catalyst 9.

It should be noted that, in the case where the exhaust gas having the air/fuel ratio close to the stoichiometric air/fuel ratio is introduced into the three way catalyst, the hydrocarbon HC and the carbonmonoxide CO contained in the exhaust gas are reacted with the oxygen $O_2$ and are oxidized into $H_2O$ and $CO_2$, and simultaneously therewith, the NOx contained in the exhaust gas is reduced into $H_2O$, $CO_2$ and $N_2$. However, as in the case of the start of the internal combustion engine when the increased compensation of the fuel injection amount is effected and the oxygen concentration of the exhaust gas is low and the HC and the CO are excessive, the NOx contained in the exhaust gas is reacted with the HC and CO and reduced into $H_2O$, $CO_2$ and $N_2$ but the excessive HC and CO are not oxidized.

Therefore, the ECU 15 feeds a drive current to the air pump 11 when an electric signal representative of the ON switch of the starter switch is applied to the ECU 15 by the starter switch sensor 23. The ECU 15 pressurizes and feeds the fresh air that flows through the intake passage downstream of the air cleaner. At this time, the secondary air is fed into the exhaust gas flowing through the exhaust pipe 6 so that the air/fuel ratio of the exhaust gas that is introduced into the third three way catalyst 9 is changed on the lean side.

Subsequently, when the start of the internal combustion engine 1 is completed, the exhaust gas from the respective cylinders of the first cylinder bank 1a of the internal combustion engine 1 is introduced into the first exhaust pipe 4 through the first exhaust manifold 2, and the exhaust gas from the respective cylinders of the second cylinder bank 1b are introduced into the second exhaust pipe 5 through the second exhaust manifold 3.

The exhaust gas that has been introduced into the first exhaust pipe 4 is introduced into the first three way catalyst 7 in the midway of the first exhaust pipe 4 and the unburnt hydrocarbon (HC) contained in the exhaust gas is temporarily adsorbed onto the first three way catalyst 7. Subsequently, the unburnt gas component discharged from the first three way catalyst 7 is introduced into the third three way catalyst 9 through the first exhaust pipe 4 and the exhaust pipe 6.

On the other hand, the exhaust gas that has been introduced into the second exhaust pipe 5 is introduced into the second three way catalyst 8 in the midway of the second exhaust pipe 5 and the unburnt hydrocarbon (HC) contained in the exhaust gas is temporarily adsorbed onto the second three way catalyst 8. Then, the exhaust discharged from the second three way catalyst 8 is introduced into the third three way catalyst 9 through the second exhaust pipe 5 and the exhaust pipe 6.

The unburnt hydrocarbon (HC) of the exhaust gas from the first exhaust pipe 4 and the second exhaust pipe 5 is removed by the first three way catalyst 7 and the second three way catalyst 8. Accordingly, even if the third three way catalyst 9 is not active, the unburnt hydrocarbon (HC) is not discharged downstream of the third three way catalyst 9.

Subsequently, the temperature of the first three way catalyst 7 and the second three way catalyst 8 is elevated by the heat of the exhaust gas but the second three way catalyst 3 is located more on the side of the exhaust port of the internal combustion engine 1 than the first three way catalyst 7. Accordingly, the second three way catalyst 8 is exposed in the exhaust gas kept at a higher temperature than that of the first three way catalyst 7.

Thus, it is possible to realize a desorption/adjustment means for differentiating the temperatures of the exhaust gas introduced into the first three way catalyst 7 and the second three way catalyst 8 from each other by differentiating the distance from the first three way catalyst 7 to the internal combustion engine 1 from the distance from the second three way catalyst 8 to the internal combustion engine 1.

Then, the temperature elevation rate of the second three way catalyst 8 is higher than that of the first three way catalyst 7. The temperature of the second three way catalyst 8 more quickly reaches the predetermined temperature than the first three way catalyst 7. The second three way catalyst releases the unburnt hydrocarbon (HC) adsorbed thereto.

The unburnt hydrocarbon (HC) desorbed away from the above-described second three way catalyst 8 is discharged from the second three way catalyst 8 together with the exhaust gas and introduced into the third three way catalyst 9 through the second exhaust pipe 5 and the exhaust pipe 6.

Since the exhaust system of the above-described internal combustion engine is designed so that the third three way catalyst 9 is activated before the second three way catalyst 8 reaches the desorption temperature, the unburnt hydrocarbon (HC) that has been desorbed from the second three way catalyst is oxidized or reduced by the third three way catalyst 9.

Thereafter, the first three way catalyst 7 reaches the predetermined temperature and the unburnt hydrocarbon (HC) which has been adsorbed to the first three way catalyst 7 is desorbed therefrom. The unburnt hydrocarbon (HC) which has been desorbed away from the first three way catalyst 7 is discharged from the first three way catalyst 7 together with the exhaust gas and subsequently introduced into the third three way catalyst 9 through the first exhaust pipe 4 and the exhaust pipe 6. Then, the third three way catalyst 9 oxidizes, reduces, and discharges the above-described unburnt hydrocarbon (HC) on the downstream side.

The desorption timing of the first three way catalyst 7 and the desorption timing of the second three way catalyst 8 will now be described with reference to FIG. 5. A curve a in FIG. 5 is a curve representative of a result from the measurement of the HC concentration of the exhaust gas upstream of the first three way catalyst 7 or the second three way catalyst 8 and shows the existence of a large amount of the HC in the exhaust gas in the start of the internal combustion engine 1.

Figure 5:
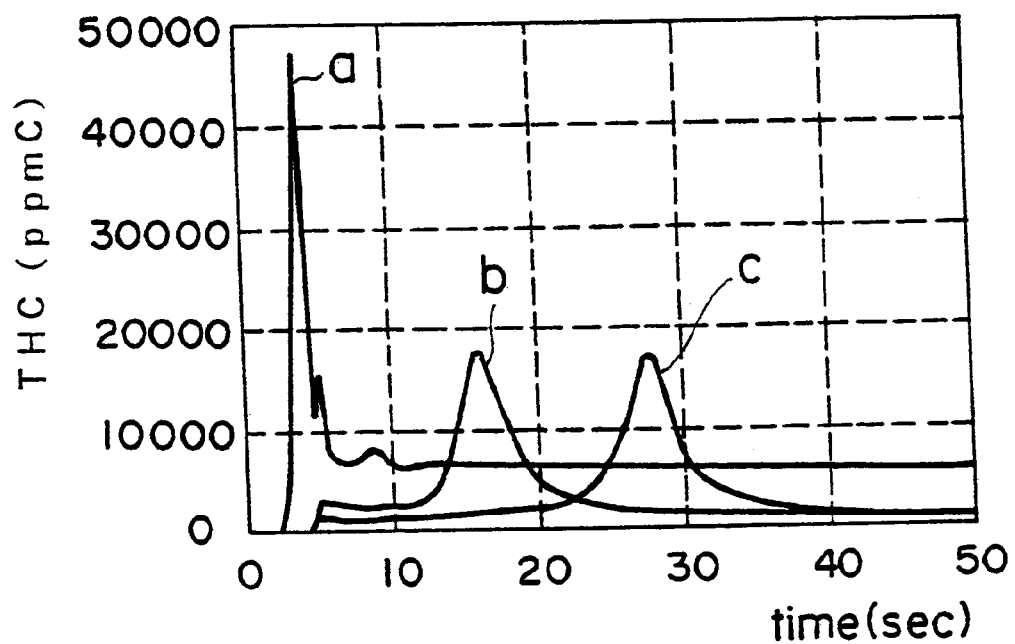
FIG. 5 is a view showing an unburnt hydrocarbon desorption timing of the first three way catalyst and a second three way catalyst.

Subsequently, a curve b in FIG. 5 is a curve representative of a result from the measurement of the HC concentration of the exhaust gas upstream of the second three way catalyst 8 and shows the fact that the HC concentration is high at the time when about fifteen seconds have lapsed from the start of the internal combustion engine 1 and the HC has been desorbed from the second three way catalyst 8.

Then, a curve c in FIG. 5 is a curve representative of a result from the measurement of the HC concentration of the exhaust gas downstream of the first three way catalyst 7 and shows the fact that the HC concentration is high at the time when about twenty-five seconds have lapsed from the start of the internal combustion engine 1 and the HC has been desorbed from the first three way catalyst 7.

It is possible to differentiate the timings when the respective three way catalysts 7 and 8 release the HC, respectively, by differentiating the distance from the exhaust port of the internal combustion engine 1 to the first three way catalyst 7 from the distance from the exhaust port to the second three way catalyst 8. It is possible to prevent all the unburnt hydrocarbon (HC), that has been adsorbed on the first three way catalyst 7 and the second three way catalyst 8, from being introduced into the third three way catalyst 9.

As a result, by the exhaust gas purifying apparatus for an internal combustion engine according to this embodiment, it is possible to suppress the capacity increase of the third three way catalyst and the enlargement of the heater 12 by the capacity increase.

In this embodiment, the three way catalyst is used for the adsorption/desorption means, but an adsorbent including a zeolite may also be used.

Embodiment 2

An exhaust gas purifying apparatus for an internal combustion engine in accordance with a second embodiment of the present invention will now be described with reference to the drawings. In this case, only a structure which is different from the first embodiment will be described.

Figure 6:
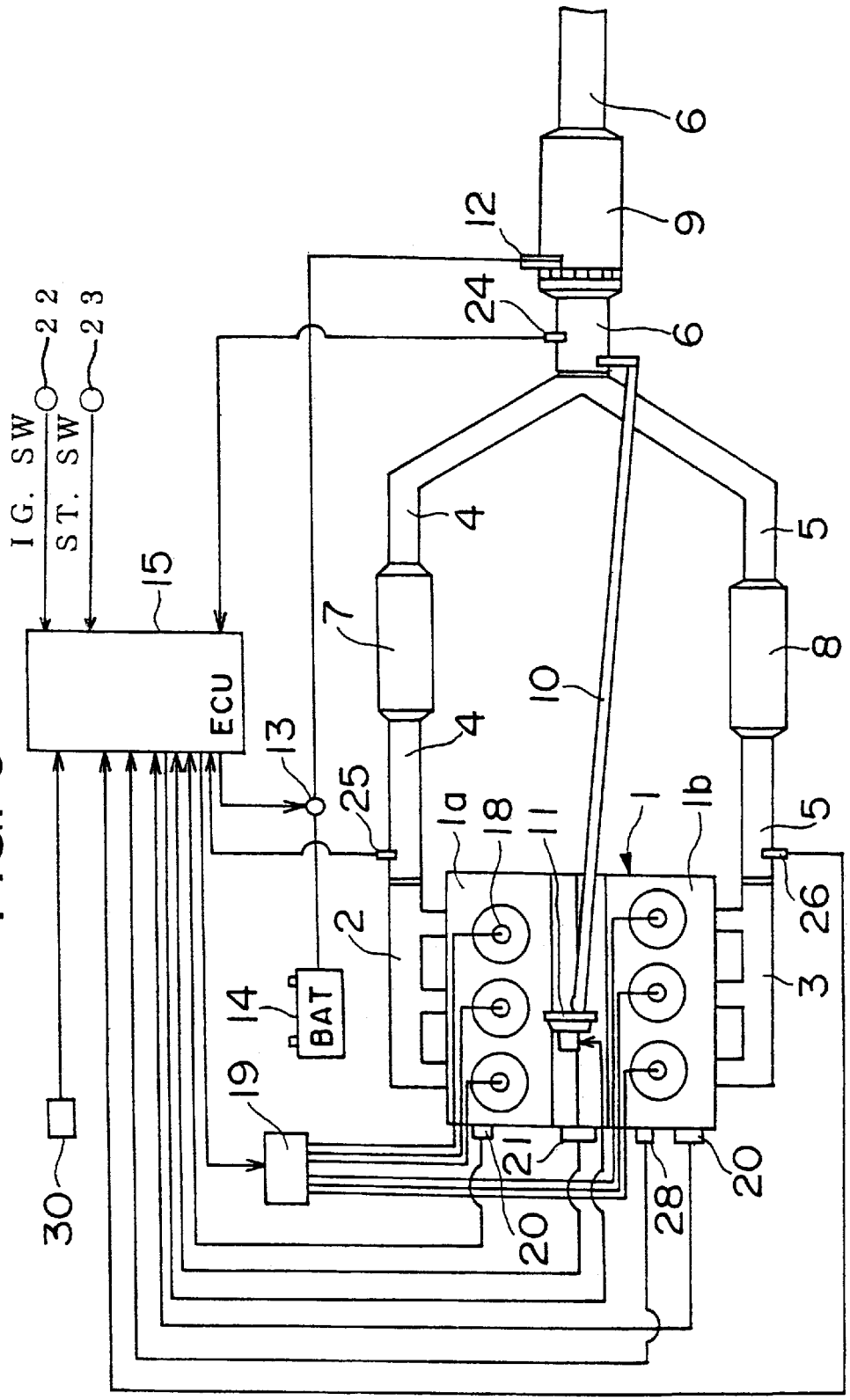
FIG. 6 is a schematic view showing a structure of an internal combustion engine and an exhaust system to which an exhaust gas purifying apparatus according to an embodiment 2 is applied.

FIG. 6 is a view showing a schematic structure of an internal combustion engine 1 to which the exhaust gas purifying apparatus for an internal combustion engine in accordance with this embodiment is applied and an exhaust system thereof.

In this embodiment, the distance from the first three way catalyst 7 to the exhaust port of the first cylinder bank 1a is the same as the distance from the second three way catalyst 8 to the exhaust port of the second cylinder bank 1b.

Then, an ignition coil 18 is provided in each cylinder of the internal combustion engine 1 for converting a low voltage current to a high voltage current from an ignitor 19 and for applying it to each ignition plug. The ignitor 19 applies a low voltage drive current to each ignition coil 18 in accordance with a control signal from the ECU 15.

Also, the internal combustion engine 1 is provided with a crank angle sensor 21 for outputting an electric signal in every 10° of the crankshaft (not shown) and a water temperature sensor 28 for detecting a temperature of cooling water.

Furthermore, cam position sensors are mounted on the cylinder heads of the respective cylinder banks 1a and 1b of the internal combustion engine 1 for detecting rotational positions of cam shafts (not shown). An air flow meter 30 for outputting an electric signal in correspondence with an air mass flowing through the intake pipe (not shown) of the internal combustion engine 1 is mounted in the intake pipe.

The above-described cam position sensors 20 are electromagnetic pickup-type sensors for outputting electric signals before the top dead center of the compression stroke of the cylinder which is a reference cylinder. In this case, the above-described cam position sensors 20 are set so that the electric signal outputted from the crank angle sensor 21 immediately after the output of the cam position sensors 20 is set at 10° before the top dead center of the compression stroke of the above-described reference cylinder.

Subsequently, the ECU 15 is connected to various sensors (not shown) in addition to an ignition switch sensor (IGSW) 22, a starter switch sensor (STSW) 23, the air/fuel sensors 25 and 26, the oxygen sensor 24, the cam position sensors 20, the above-described crank angle sensor 21 and calculates an electric application timing of the heater 12, a secondary air feeding amount, a secondary air feeding timing, a fuel injection amount (a length of the fuel injection time), a fuel injection timing, an ignition timing or the like, to control the relay 13, the air pump 11, the ignitor 19 and the like in accordance with the signals from the respective sensors.

For instance, when the ignition timing of each cylinder of the internal combustion engine 1 is determined, the ECU 15 uses the degree of 10° before the above-described compression top dead center as an ignition reference position of the above-described reference cylinder and compensates for the above-described ignition reference position in accordance with the cooling water temperature, the engine RPM or the intake pipe vacuum pressure to thereby calculate the optimum ignition timing.

Then, in the starting operation of the internal combustion engine 1, the ECU 15 seeks the ignition reference position of the above-described reference cylinder in accordance with a signal from the above-described cam position sensor 20 and the crank angle sensor 21. Subsequently, after the completion of the starting operation of the internal combustion engine 1, the ECU 15 accumulates a basic advance angle on the basis of the intake pipe vacuum pressure, the engine RPM or the like, and simultaneously calculates the warming-up compensation advance angle on the basis of the cooling water temperature to determine the ignition timing of each cylinder by adding the above-described basic advance angle and the above-described warming-up compensation advance angle to the above-described reference position.

Furthermore, in accordance with this embodiment, in the warming-up operation after the completion of the starting operation of the internal combustion engine 1, the ECU 15 differentiates the ignition timing of the first cylinder bank 1a and the second cylinder bank 1b from each other. In this case, the ECU 15 sets the warming-up timing in response to the temperature of the cooling water for the starting operation and determines the ignition timings of each cylinder bank 1a and 1b in accordance with a map as shown in FIG. 7.

Figure 7:
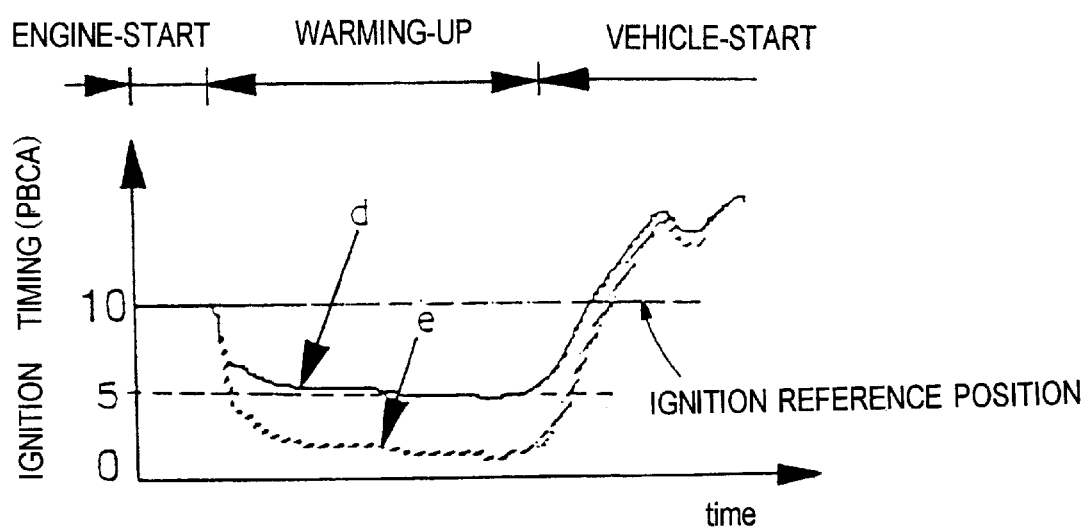
FIG. 7 is a view showing a relationship between an ignition timing of a first cylinder bank and an ignition timing of a second cylinder bank.

In FIG. 7, the ignition timing of the first cylinder bank 1a and the second cylinder bank 1b to the above-described ignition reference position (10° before the compression top dead center of each cylinder) in the starting operation of the internal combustion engine 1. Then, in the warming-up operation after the completion of the starting operation of the internal combustion engine 1, the ignition timing (d in FIG. 7) of the second cylinder bank 1b is set at about 5° immediately before the compression top dead center and simultaneously the ignition timing (e in FIG. 7) of the first cylinder bank 1a is set at a delay to the ignition timing of the above-described second cylinder bank 1b (in the vicinity of the compression top dead center).

Incidentally, in FIG. 7, there is shown an example in which the ignition timing of the first cylinder bank 1a is delayed to the ignition timing of the second cylinder bank 1b. However, needless to say, it is possible to delay the ignition timing of the second cylinder bank 1b to the ignition timing of the first cylinder bank 1a.

<Operation and Advantage of Second Embodiment>

The operation and advantage of the exhaust gas purifying apparatus for an internal combustion engine in accordance with the embodiment will now be described.

When the internal combustion engine 1 is to be started, the ECU 15 judges the starting operation start of the internal combustion engine 1 at the moment when the signal from the ignition switch sensor 23 is inputted thereinto, and receives the electric signals from the crank angle sensor 21, the cam position sensors 20, the water temperature sensor 28 and the air flow meter 30. Then, the ECU 15 calculates the ignition timing (valve opening period) of each fuel injection valve in accordance with the signal from each sensor, judges the ignition reference position of the reference cylinder in accordance with the electric signals from the cam position sensor 20 and the crank angle sensor 21 and feeds the ignition signal to the ignitor 19 while regarding the above-described ignition reference position as the ignition timing of the above-descried reference cylinder.

When the ignitor 19 receives the ignition signal, the ignitor 19 applies the low voltage drive current to the ignition coil 18 of the above-described reference cylinder. At this time, the ignition coil 18 of the above-described reference cylinder converts the above-described drive current to the high voltage drive current and applies it to the ignition plug. Subsequently, after the ECU 15 outputs the above-described ignition signal, the ECU 15 calculates the ignition timing for the next cylinder when the first electric signal is inputted thereinto from the crank angle sensor 21.

When the internal combustion engine 1 is started by repeating such operation, as described in conjunction with the above-described first embodiment, a large amount of unburnt hydrocarbon (HC) is discharged from the internal combustion engine. The unburnt hydrocarbon (HC) is temporarily adsorbed to the first three way catalyst 7 and the second three way catalyst 8.

Then, as mentioned above in conjunction with FIG. 7, in the warming-up operation of the internal combustion engine 1, the ECU 15 determines the ignition timing for each cylinder so that the ignition timing of the first cylinder bank 1a is delayed to the ignition timing of the second cylinder bank 1b. In this case, since the conditions other than that for the ignition timing are set at the same conditions for the first cylinder bank 1a and the second cylinder bank 1b, the combustion of each cylinder of the first cylinder bank 1a is performed at the timing delayed to each cylinder of the second cylinder bank 1b. At the valve opening timing of the exhaust valve (not shown), the combustion gas temperature of each cylinder of the first cylinder bank 1a is higher than the combustion gas temperature of each cylinder of the second cylinder bank 1b.

As a result, the temperature of the exhaust gas discharged from the first cylinder bank 1a is higher than that of the exhaust gas discharged from the second cylinder bank 1b, and the exhaust gas kept at a higher temperature than the second three way catalyst 8 is introduced into the first three way catalyst 7. Then, the first three way catalyst 7 reaches at a predetermined temperature at an earlier stage than that of the second three way catalyst 8.

Figure 8:
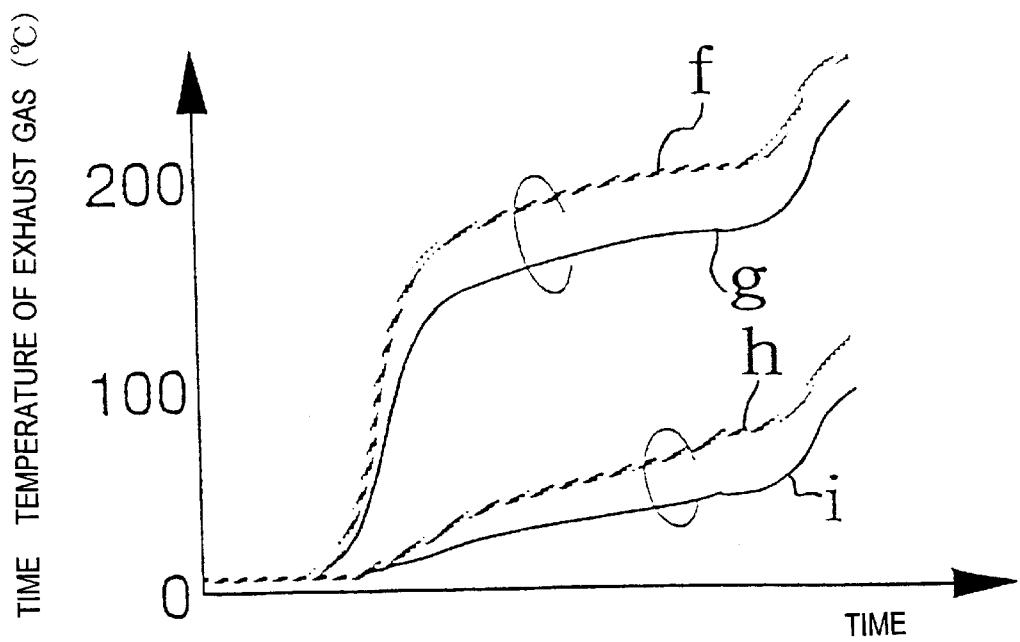
FIG. 8 is a view showing a relationship between a temperature of the exhaust gas introduced into the first three way catalyst and the second three way catalyst and time and a relationship between a bet temperature of the first three way catalyst and the second three way catalyst and time.

Now, the relationship between time and a temperature of the exhaust gas introduced into the first three way catalyst 7 and the second three way catalyst 8 and a relationship between time and a bed temperature of the first three way catalyst 7 and the second three way catalyst 8 will now be described with reference to FIG. 8. In FIG. 8, a curve f is a curve representative of a result of the measurement of the temperature of the exhaust gas introduced into the first three way catalyst 7, and a curve g is a curve representative of a result of the measurement of the temperature of the exhaust gas introduced into the second three way catalyst 8. It is understood from the curves f and g that the temperature of the exhaust gas introduced into the first three way catalyst 7 is higher than that of the exhaust gas introduced into the second three way catalyst 8.

Subsequently, a graph h in FIG. 8 is a graph representative of the bed temperature of the first three way catalyst 7 and a graph i is a graph representative of the bed temperature of the second three way catalyst 8. It is understood from these two curves that the bed temperature of the first three way catalyst 7 is earlier elevated than the second three way catalyst 8.

Thus, the ignition timing of the first cylinder bank 1a is set to be delayed to the ignition timing of the second cylinder bank 1b so that the first three way catalyst 7 earlier reaches the predetermined temperature than the second three way catalyst 8 and desorbs the unburnt hydrocarbon (HC) adsorbed in the starting operation of the internal combustion engine 1. Then, the unburnt hydrocarbon (HC) desorbed from the first three way catalyst 7 is discharged from the first three way catalyst 7 together with the exhaust gas and introduced into the third three way catalyst 9 through the first exhaust pipe 4 and the exhaust pipe 6. Here, since the exhaust gas system of the internal combustion engine 1 is designed so that the third three way catalyst 9 is activated before the first three way catalyst 7 reaches the desorption temperature, the unburnt hydrocarbon (HC) desorbed from the first three way catalyst 7 is oxidized or reduced by the third three way catalyst 9.

Thereafter, the second three way catalyst 8 reaches the predetermined temperature and desorbes the unburned hydrocarbon (HC) adsorbed thereto. Then, the hydrocarbon (HC) desorbed from the second three way catalyst 8 is discharged from the second three way catalyst 8 together with the exhaust gas and introduced into the third three way catalyst 9 through the second exhaust pipe 5 and the exhaust pipe 6. Then, the third three way catalyst 9 oxidizes or reduces the unburnt hydrocarbon (HC) and discharges it on the downstream side.

Accordingly, in accordance with the embodiment, it is possible to differentiate the timing for desorbing the unburnt hydrocarbon (HC) by the first three way catalyst 7 from the timing for unburnt hydrocarbon (HC) by the second three way catalyst 8 to avoid the introduction of all the unburnt hydrocarbon (HC) adsorbed to the first three way catalyst 7 and the second three way catalyst 8 into the third three-way catalyst 9. Accordingly, it is possible to suppress the capacity increase of the third three way catalyst 9 and the enlargement of the heater 12 by the capacity increase.

Embodiment 3

An exhaust gas purifying apparatus for an internal combustion engine in accordance with a third embodiment of the present invention will now be described with reference to the drawings. In this case, only a structure which is different from the first embodiment will be described.

Figure 9:
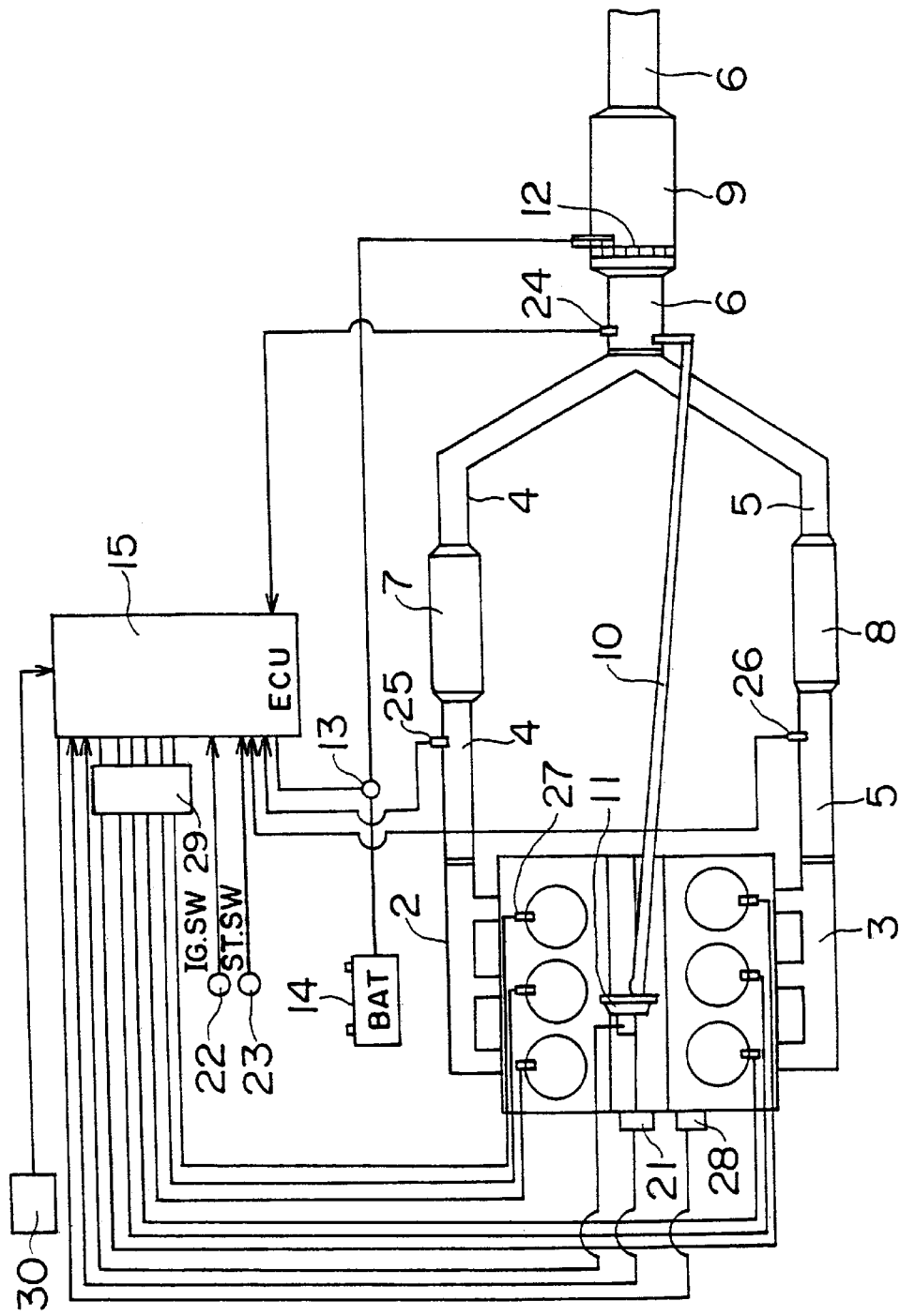
FIG. 9 is a schematic view showing a structure of an internal combustion engine and an exhaust system to which an exhaust gas purifying apparatus according to an embodiment 3 is applied.

FIG. 9 is a view showing a schematic structure of an internal combustion engine 1 to which the exhaust gas purifying apparatus for an internal combustion engine in accordance with this embodiment is applied and an exhaust system thereof.

In this embodiment, the distance from the first three way catalyst 7 to the exhaust port of the first cylinder bank 1a is the same as the distance from the second three way catalyst 8 to the exhaust port of the second cylinder bank 1b.

A fuel injection valve 27 is mounted on each intake port or each cylinder of the internal combustion engine 1. When a drive current is applied from a drive circuit 29, the fuel injection valve 27 is opened for injection of fuel. The above-described drive circuit 29 applies the drive current to each fuel injection valve 27 in accordance with a control signal from the ECU 15.

Also, mounted on the internal combustion engine 1 are a crank angle sensor 21 for outputting an electric signal for every rotation of 10° of the crankshaft (not shown), and a water temperature sensor 28 for detecting a temperature of cooling water. An air flow meter 30 for outputting an electric signal in response to an air mass flowing through the intake pipe (not shown) is mounted on the intake pipe.

Subsequently, the ECU 15 is connected to various sensors (not shown) in addition to an ignition switch sensor (IGSW) 22, a starter switch sensor (STSW) 23, the air/fuel sensors 25 and 26, the oxygen sensor 24, the crank angle sensor 21, the water temperature sensor 28 and the air flow meter 30 and calculates an electric application timing of the heater 12, a secondary air feeding amount, a secondary air feeding timing, a fuel injection amount (a length of the fuel injection time), a fuel injection timing, an ignition timing or the like, to control the relay 13, the air pump 11, the drive circuit 29 and the like in accordance with the signals from the respective sensors.

For instance, when a length of the fuel injection time of each cylinder of the internal combustion engine 1 is to be determined, the ECU 15 calculates the engine RPM in accordance with the electric signal from the above-described crank angle sensor, calculates the basic fuel injection amount (the basic length of the fuel injection time for the fuel injection valve corresponding to each cylinder) of each cylinder in accordance with the electric signals from the water temperature sensor 28 and the above-described air flow meter and the engine RPM thus calculated, and determines the fuel injection timing of each fuel injection valve 27 by the compensation for the calculated basic fuel injection amount in response to the intake air temperature, the cooling water temperature or the operational condition of the internal combustion engine.

More specifically, the ECU 15 calculates the engine RPM in cranking in accordance with the electric signal from the above-described crank angle sensor 21 in the starting operation of the internal combustion engine 1 and determines the length of the fuel injection time in response to the calculated engine RPM and the electric signal from the water temperature sensor 28.

Then, when the starting operation of the internal combustion engine is completed, the ECU 15 calculates the basic length of the fuel injection time on the basis of the intake air amount and the engine RPM and compensates for the above-described basic length of the fuel injection time in response to the water temperature to determine the length of the fuel injection time.

Furthermore, in accordance with this embodiment, the ECU 15 controls the warming-up operation after the completion of the starting operation of the internal combustion engine 1 so that the air/fuel ratio of the mixture to be burnt in each cylinder of the first cylinder bank 1a is differentiated from the air/fuel ratio of the mixture to be burnt in each cylinder of the second cylinder bank 1b. In this case, the ECU 15 sets the warming-up time in response to the temperature of the cooling water in the starting operation and subsequently calculates the length of the fuel injection time of each cylinder bank 1a, 1b in accordance with a map shown in FIG. 10.

Figure 10:
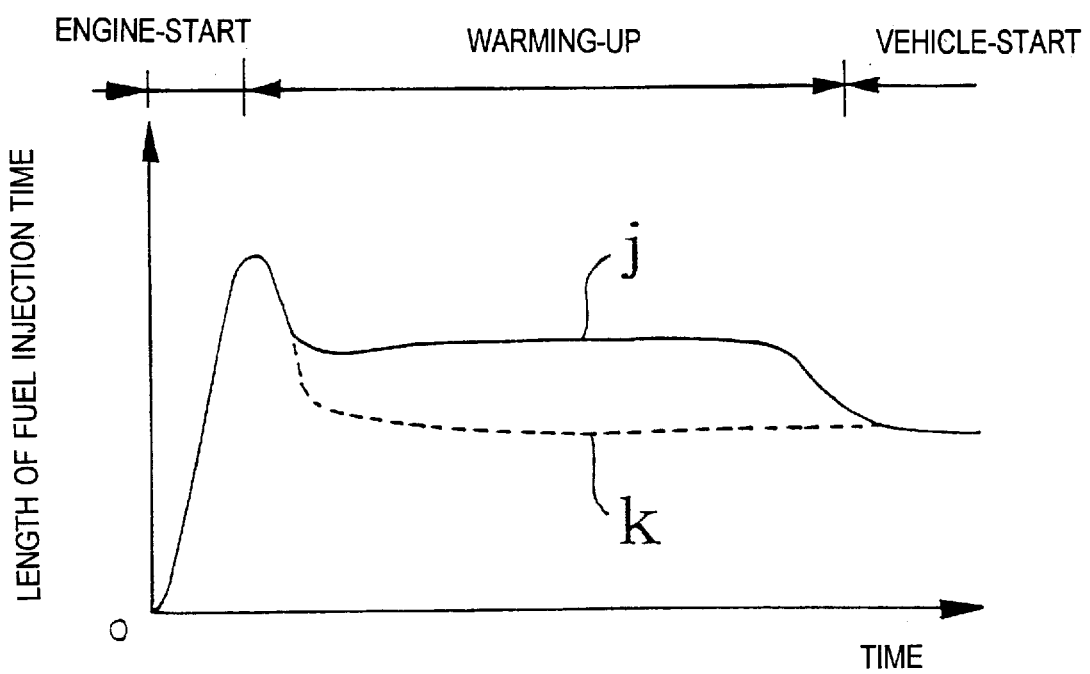
FIG. 10 is a view showing a fuel injection timing of the first cylinder bank and the a fuel injection timing of the second cylinder bank.

A curve j in FIG. 10 is a curve representative of the length of the fuel injection time of the first cylinder bank 1a, and a curve k is a graph representative of the length of the fuel injection time of the second cylinder bank 1b. In this case, in the starting operation of the internal combustion engine 1, lengths of fuel injection times of the first cylinder bank 1a and the second cylinder bank 1b are set in the same manner and in order to enhance the startability of the internal combustion engine 1, the mixture of the atmosphere is enriched.

Subsequently, when the starting operation of the internal combustion engine 1 is completed and moved to the warming-up condition, the length of the fuel injection time of the first cylinder bank 1a is set to be longer than the length of the fuel injection time of the second cylinder bank 1b. Furthermore, when the vehicle runs, the length of the fuel injection time of the first cylinder bank 1a and the length of the fuel injection time of the second cylinder bank 1b are set to be the same.

Figure 11:
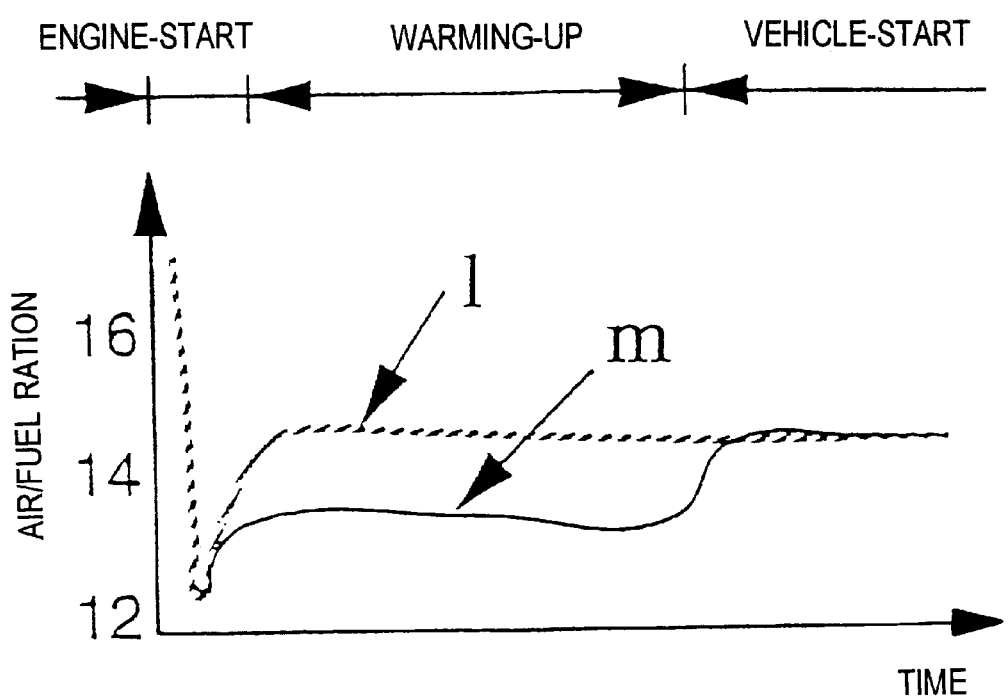
FIG. 11 is a view showing a relationship between an air/fuel ratio of the first cylinder bank and an air/fuel ratio of the second cylinder bank.

By thus setting lengths of fuel injection times of the respective cylinder banks 1a and 1b, as shown in FIG. 11, the air/fuel ratio of each cylinder bank 1a, 1b is set so that the air/fuel ratio (curve m in FIG. 11) of the first cylinder bank 1a is shifted more on the enriched side atmosphere than the air/fuel ratio (curve 1 in FIG. 11) of the second cylinder bank 1b.

Incidentally, there is described an example in which the length of the fuel injection time of the first cylinder bank 1a is set to be longer than the length of the fuel injection time of the second cylinder bank 1b. However, needless to say, it is possible to set that the length of the fuel injection time of the second cylinder bank 1b is longer than the length of the fuel injection time of the first cylinder bank 1b.

<Operation and Advantage of Third Embodiment>

The operation and advantage of the exhaust gas purifying apparatus for an internal combustion engine in accordance with the embodiment will now be described.

When the internal combustion engine 1 is to be started, the ECU 15 judges the starting operation start of the internal combustion engine 1 at the moment when the signal from the ignition switch sensor 23 is inputted thereinto, and receives the electric signals from the crank angle sensor 21 and the air flow meter 30. Then, the ECU 15 calculates the length of the fuel injection time (valve opening period) of each fuel injection valve in accordance with the signal from each sensor, and calculates the fuel injection starting timing of each fuel injection valve in accordance with the signal from the above-described crank angle sensor 21.

Subsequently, the ECU 15 refers to the signal from the crank angle sensor 21, and feeds a signal representative of the above-described length of the fuel injection time to the drive circuit 29 when the rotational position of the crankshaft reaches the above-described fuel injection starting timing.

The drive circuit 29 applies the drive current to the fuel injection valve 27 of each cylinder when it receives the signal representative of the length of the fuel injection time.

Then, the drive circuit 29 stops the application of the drive current to the above-described fuel injection valve 27 at the moment when the above-described length of the fuel injection time has lapsed from the application start of the drive current. At this time, the fuel injection valve 27 of each cylinder continuously opens during the period of the drive current application from the drive circuit 29 and continuously injects the fuel.

When the internal combustion engine 1 is started by repeating such operation, as described in conjunction with the above-described first embodiment, a large amount of unburnt hydrocarbon (HC) is discharged from the internal combustion engine. The unburnt hydrocarbon (HC) is temporarily adsorbed to the first three way catalyst 7 and the second three way catalyst 8.

Then, as mentioned above in conjunction with FIG. 10, in the warming-up operation of the internal combustion engine 1, the ECU 15 determines the length of the fuel injection time for each cylinder so that the length of the fuel injection time of the first cylinder bank 1a is longer than the length of the fuel injection time of the second cylinder bank 1b. In this case, since the conditions other than that for the length of the fuel injection time are set at the same conditions for the first cylinder bank 1a and the second cylinder bank 1b, the combustion of the leaner mixture of each cylinder of the second cylinder bank 1b than that of each cylinder of the first cylinder bank 1a is performed. As a result, the combustion gas temperature of each cylinder of the second cylinder bank 1b is higher than the combustion gas temperature of each cylinder of the first cylinder bank 1a.

Therefore, the temperature of the exhaust gas discharged from the second cylinder bank 1b is higher than that of the exhaust gas discharged from the first cylinder bank 1a, and the exhaust gas kept at a higher temperature than the first three way catalyst 7 is introduced into the second three way catalyst 8. Then, the second three way catalyst 8 reaches a predetermined temperature at an earlier stage than that of the first three way catalyst 7.

The air/fuel ratio of the mixture to be burnt in the second cylinder bank 1b is thus set to be leaner than the air/fuel ratio of the mixture to be burnt in the first cylinder bank 1a so that the second three way catalyst 8 reaches the predetermined temperature earlier than the first three way catalyst 7 and desorbs the unburnt hydrocarbon (HC) adsorbed in the starting operation of the internal combustion engine 1. Then, the unburnt hydrocarbon (HC) desorbed from the second three way catalyst 8 is discharged from the second three way catalyst 8 together with the exhaust gas and introduced into the third three way catalyst 9 through the second exhaust pipe 5 and the exhaust pipe 6. In this case, since the exhaust system of the internal combustion engine 1 is designed so that the third catalyst 9 is activated before the second three way catalyst 8 reaches the desorption temperature, the unburnt hydrocarbon (HC) desorbed from the second three way catalyst 8 is oxidized or reduced by the third three way catalyst 9.

Thereafter, the first three way catalyst 7 reaches the predetermined temperature and releases the unburnt hydrocarbon (HC) adsorbed thereto. Then, the unburnt hydrocarbon (HC) desorbed from the first three way catalyst 7 is discharged from the first three way catalyst 7 together with the exhaust gas, and introduced into the third three way catalyst 9 through the first exhaust pipe 4 and the exhaust pipe 6. Then, the third three way catalyst 9 oxidizes or reduces the unburnt hydrocarbon (HC) and discharges it on the downstream side.

Accordingly, in accordance with the embodiment, it is possible to differentiate the timing for desorbing the unburnt hydrocarbon (HC) by the first three way catalyst 7 from the timing for unburnt hydrocarbon (HC) by the second three way catalyst 8 to avoid the introduction of all the unburnt hydrocarbon (HC) adsorbed to the first three way catalyst 7 and the second three way catalyst 8 into the third three way catalyst 9. It is possible to suppress the capacity increase of the third three way catalyst and the enlargement of the heater 12 by the capacity increase.

Embodiment 4

An exhaust gas purifying apparatus for an internal combustion engine in accordance with fourth embodiment of the present invention will now be described with reference to the drawings. In this case, only a structure which is different from the first embodiment will be described.

Figure 12:
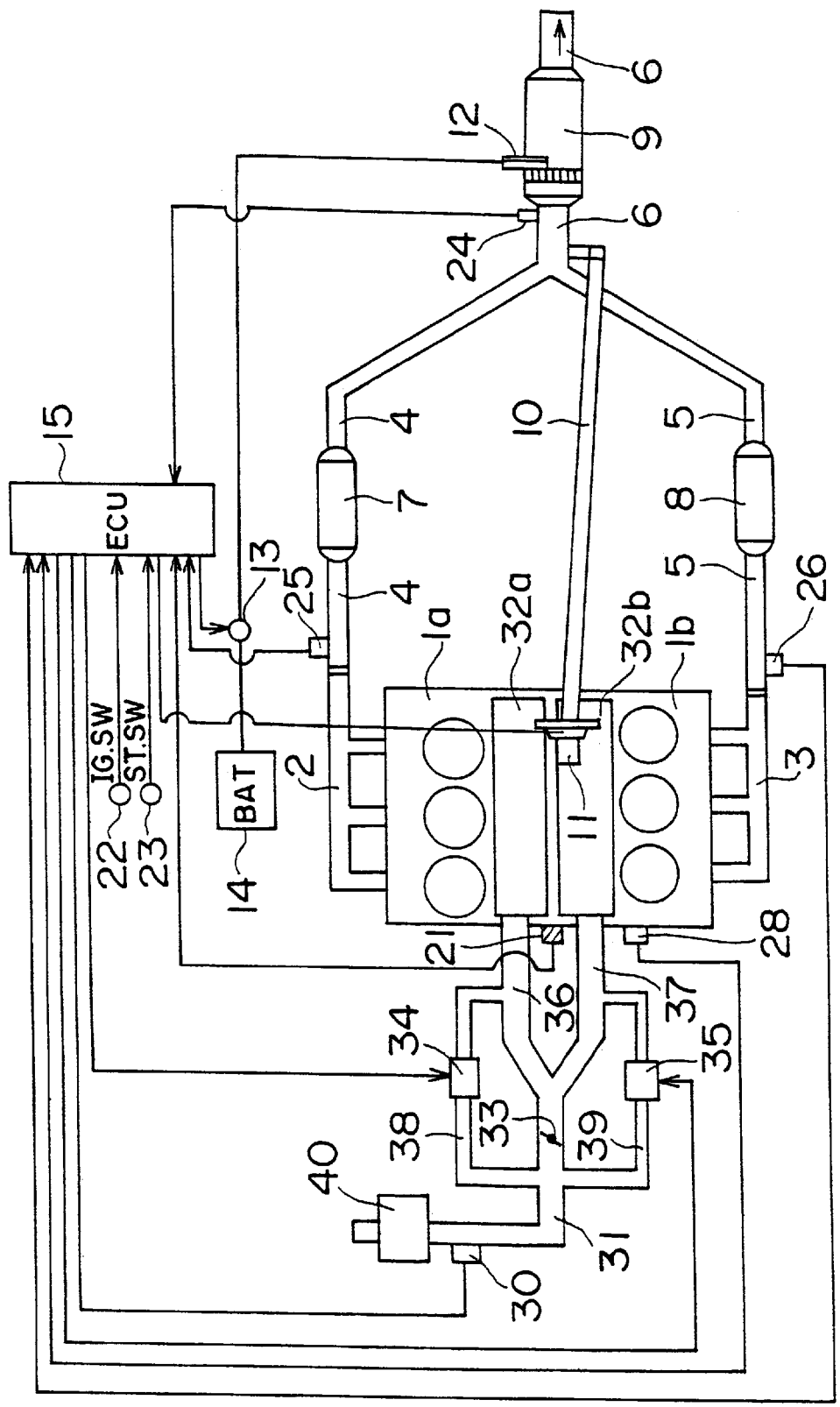
FIG. 12 is a schematic view showing a structure of an internal combustion engine and an exhaust system to which an exhaust gas purifying apparatus according to an embodiment 4 is applied.

FIG. 12 is a view showing a schematic structure of an internal combustion engine 1 to which the exhaust gas purifying apparatus for an internal combustion engine in accordance with this embodiment is applied and an exhaust system thereof.

In this embodiment, the distance from the first three way catalyst 7 to the exhaust port of the first cylinder bank 1a is the same as the distance from the second three way catalyst 8 to the exhaust port of the second cylinder bank 1b.

Then, surge tanks 32a and 32b, which are independent of each other, are provided in the first cylinder bank 1a and the second cylinder bank 1b of the internal combustion engine 1. A first intake pipe 36 is connected to the surge tank 32a on the side of the first cylinder bank 1a and a second intake pipe 37 is connected to the surge tank 32b on the side of the second cylinder bank 1b. The above-described first and second intake pipes 36 and 37 are merged together on the upstream side to form a single intake pipe 31.

An air cleaner box 40 is connected to an end portion on the upstream side of the above-described intake pipe 31. An air flow meter 30 for outputting an electric signal in response to an air mass flowing through the intake pipe 31 is mounted on the intake pipe 31 downstream of this air cleaner box 40. A throttle valve 33 for opening/closing the air passage within the intake pipe 31 is mounted in the intake pipe 31 downstream of the air flow meter 30.

Two bypass pipes 38 and 39 are connected to the intake pipe 31 between the above-described throttle valve 33 and the air flow meter 30. One bypass pipe 38 of these two bypass pipes 38 and 39 is connected to the first intake pipe 36 through a first idle speed control valve (ISCV) 34, and the other bypass pipe 39 is connected to a second pipe 37 through a second idle speed control valve (ISCV) 35.

When the internal combustion engine 1 is kept under an idle condition (fully closed condition of the throttle valve 33), the above-described first and second idle speed control valves 34 and 35 are closed in accordance with the control signal of the ECU 15 and the fresh air flowing through the intake pipe 31 upstream of the throttle valve 33 is fed to the first intake pipe 36 and the second intake pipe 37.

Also, a crank angle sensor 21 for outputting an electric signal for every rotation of 10° of the crankshaft (not shown) and a water temperature sensor 28 for detecting a cooling water temperature are mounted on the internal combustion engine 1.

Subsequently, the ECU 15 is connected to various sensors (not shown) in addition to an ignition switch sensor (IGSW) 22, a starter switch sensor (STSW) 23, the air/fuel sensors 25 and 26, the oxygen sensor 24, the crank angle sensor 21, a water temperature sensor 28 and the air flow meter 30 and calculates an electric application timing of the heater 12, a secondary air feeding amount, a secondary air feeding timing, a fuel injection amount, a fuel injection timing, an ignition timing, an opening degree of the first and second idle speed control valves 34 and 35 or the like, to control the-relay 13, the air pump 11, the first and second idle speed control valves 34 and 35 and the like in accordance with the signals from the respective sensors.

For example, when the ECU 15 judges the idle condition of the internal combustion engine 1 from the stop condition of the vehicle, the fully closed condition of the throttle valve 33 or the like, the ECU 15 calculates a target RPM from a loading condition of a compressor for an air conditioner, an output signal from the water temperature sensor 28 or the like, compares the outputted target RPM with the engine RPM calculated on the basis of the output signal from the crank angle sensor 21 and performs the feedback control of the first and second idle speed control valves 34 and 35 so that the actual engine RPM is identified with the target RPM.

Then, in the case where the temperature of the cooling water is low as in the case where the internal combustion engine 1 is started in a cold condition, in order to accelerate the warming up the internal combustion engine, the ECU 15 performs a control so that an opening degree of each of the first and second idle speed control valves 34 and 35 is increased and the engine RPM is increased more by 50 rpm than in the normal condition. Subsequently, the ECU 15 performs a control such that the opening degree of each of the first and second idle speed control valves 34 and 35 is reduced in response to the elevation of the cooling water.

Furthermore, the ECU 15 in accordance with the embodiment performs such a control that the opening degree of the first idle speed control valve 34 is larger than the opening degree of the second idle speed control valve 35 and the intake air amount of each cylinder of the first cylinder bank 1a is greater than the intake air amount of each cylinder of the second cylinder bank 1b. In this case, the exhaust gas amount discharged from each of the cylinders of the first cylinder bank 1a is greater than the exhaust gas amount discharged from each cylinder of the second cylinder bank 1b.

Thus, the ECU 15 and the first and second idle speed control valves 34 and 35 realize a desorption adjusting means for differentiating the intake air amount of the cylinders, to which each exhaust passage (first exhaust pipe 4, second exhaust pipe 5) are connected, from each other and differentiating the exhaust gas amounts discharged from each other in every cylinder of the exhaust passage.

<Operation and Advantage of Fourth Embodiment>

The operation and advantage of the exhaust gas purifying apparatus for an internal combustion engine in accordance with the embodiment will now be described.

When the electric signal representative of the ON condition of the ignition switch is inputted into the ECU 15 by the ignition switch sensor 22 in the starting operation for the internal combustion engine 1, the ECU 15 switches the relay 13 from the OFF condition to the ON condition and applies the current from the battery 14 to the heater 12 of the third three way catalyst 9. Subsequently, when an electric signal representative of the ON condition of the starter switch is inputted into the ECU 15 by the starter switch sensor 23, the ECU 15 feeds a drive current to the air pump 11, pressurizes and feeds the fresh air, flowing through the intake flow passage downstream of the air cleaner, to the exhaust pipe 6 and causes the air/fuel ratio of the exhaust gas introduced into the third three way catalyst 9 to be close to the stoichiometric air/fuel ratio.

Subsequently, when the start of the internal combustion engine 1 is completed, the ECU 15 calculates a target RPM from a loading condition of a compressor for an air conditioner, an output signal from the water temperature sensor 28 or the like, compares the outputted target RPM with the engine RPM calculated on the basis of the output signal from the crank angle sensor 21 and performs the feedback control of the first and second idle speed control valves 34 and 35 so that the actual engine RPM is identified with the target RPM.

In this case, the ECU 15 controls the first and second idle speed control valves 34 and 35 so that the opening degree of the first idle speed control valve 34 on the side of the first cylinder bank 1a is greater than the opening degree of the second idle speed control valve 35 on the side of the second cylinder bank 1b.

Figure 13:
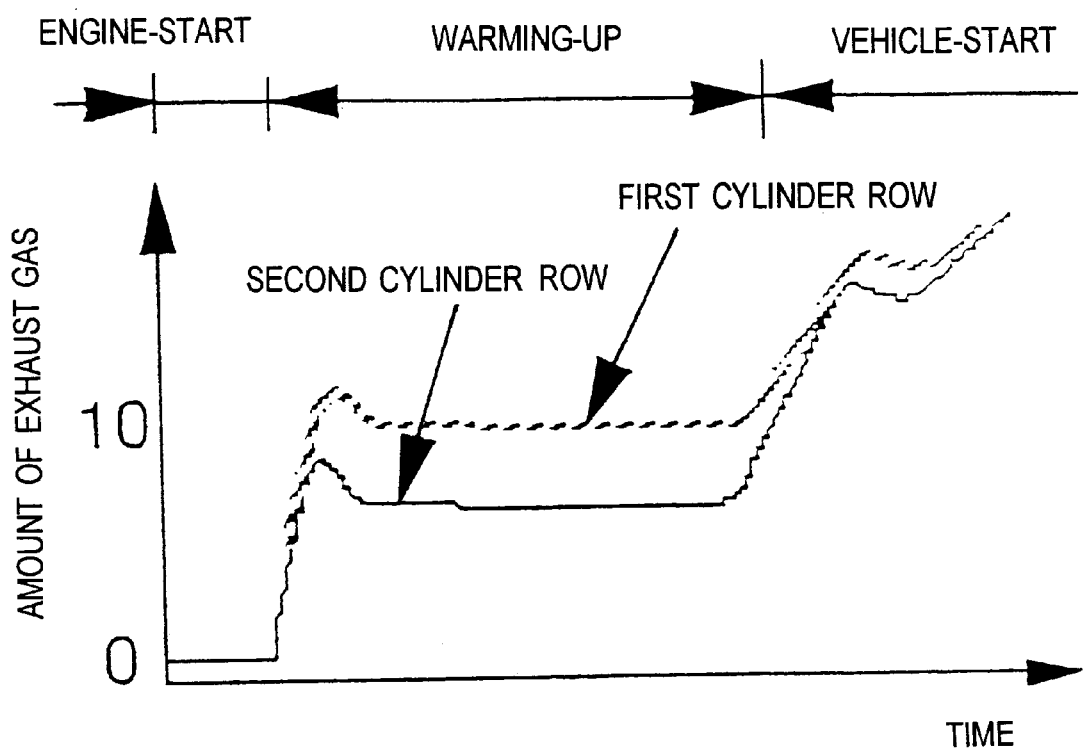
FIG. 13 is a view showing a relationship between an exhaust gas amount of the first cylinder bank and an exhaust gas amount of the second cylinder bank.

As a result, since the intake air amount of each cylinder of the first cylinder bank 1a is greater than the intake air amount of each cylinder of the second cylinder bank 1b, the amount of the exhaust gas discharged from each cylinder of the first cylinder bank 1a is greater than the amount of the exhaust gas discharged from each cylinder of the second cylinder bank 1b. This state is shown in FIG. 13. From FIG. 13, it is understood that after the completion of the starting operation of the internal combustion engine 1, the opening degree of the first idle speed control valve 34 is greater than the opening degree of the second idle speed control valve 35 so that the amount of the exhaust gas discharged from each cylinder of the first cylinder bank 1a is greater than the amount of the exhaust gas discharged from each cylinder of the second cylinder bank 1b.

Thus, the exhaust gas discharged from the respective cylinder banks 1a and 1b of the internal combustion engine 1 are caused to flow into the first exhaust manifold 2 and the second exhaust manifold 3. The exhaust gas discharged from each cylinder of the first cylinder bank 1a is caused to flow through the first exhaust manifold 2 into the first exhaust pipe 4, and the exhaust gas discharged from each cylinder of the second cylinder bank 1b is caused to flow through the second exhaust manifold 3 into the second exhaust pipe 5.

The exhaust gas that has been caused to flow into the first exhaust pipe 4 flows into the first three way catalyst 7 in the midway of the first exhaust pipe 4 and the unburnt hydrocarbon (HC) contained in the exhaust gas is temporarily adsorbed onto the first three way catalyst 7. Then, the exhaust gas discharged from the first three way catalyst 7 flows into the third three way catalyst 9 through the first exhaust pipe 4 and the exhaust pipe 6.

On the other hand, the exhaust gas that has been caused to flow into the second exhaust pipe 5 flows into the second three way catalyst 8 in the midway of the second exhaust pipe 5 and the unburnt hydrocarbon (HC) contained in the exhaust gas is temporarily adsorbed onto the second three way catalyst 8. Then, the exhaust gas discharged from the second three way catalyst 8 flows into the third three way catalyst 9 through the second exhaust pipe 5 and the exhaust pipe 6.

Since the unburnt hydrocarbon (HC) has been removed from the exhaust gas from the first exhaust pipe 4 and the second exhaust pipe 5 by the first three way catalyst 7 and the second three way catalyst 8, even if the third three way catalyst 9 is not activated, the unburnt hydrocarbon (HC) is not discharged downstream of the third three way catalyst 9.

Subsequently, the temperature of the first three way catalyst 7 and the second three way catalyst 8 is elevated by the heat of the exhaust gas but the amount of the exhaust gas discharged from the first cylinder bank 1a is greater than the amount of the exhaust gas discharged from the second cylinder bank 1b. As a result, the greater amount of the exhaust gas is introduced into the first three way catalyst 7 than into the second three way catalyst 8. As a result, the first three way catalyst 7 is exposed in the greater amount of the exhaust gas than the second three way catalyst 7 and has a higher temperature elevation rate than that of the second three way catalyst 8.

Accordingly, the first three way catalyst 7 reaches the predetermined temperature earlier than the second three way catalyst 8 and desorbs the unburnt hydrocarbon (HC).

The unburnt hydrocarbon (HC) desorbed from the first three way catalyst 7 is discharged from the first three way catalyst 7 together with the exhaust gas and introduced into the third three way catalyst 9 through the first exhaust pipe 4 and the exhaust pipe 6. In this case, since the exhaust system of the internal combustion engine 1 is designed so that the third catalyst 9 is activated before the first three way catalyst 7 reaches the desorption temperature, the unburnt hydrocarbon (HC) desorbed from the first three way catalyst 7 is oxidized or reduced by the third three way catalyst 9.

Thereafter, the second three way catalyst 8 reaches the predetermined temperature and releases the unburnt hydrocarbon (HC) adsorbed thereto. Then, the unburnt hydrocarbon (HC) desorbed from the second three way catalyst 8 is discharged from the second three way catalyst 8 together with the exhaust gas, and introduced into the third three way catalyst 9 through the second exhaust pipe 5 and the exhaust pipe 6. Then, the third three way catalyst 9 oxidizes or reduces the unburnt hydrocarbon (HC) and discharges it on the downstream side.

Accordingly, in accordance with the embodiment, it is possible to differentiate the timing for desorbing the unburnt hydrocarbon (HC) by the first three way catalyst 7 from the timing for unburnt hydrocarbon (HC) by the second three way catalyst 8 to avoid the introduction of all the unburnt hydrocarbon (HC) adsorbed to the first three way catalyst 7 and the second three way catalyst 8 into the third three way catalyst 9. Accordingly, it is possible to suppress the capacity increase of the third three way catalyst and the enlargement of the heater 12 by the capacity increase.

Incidentally, there is described an example in which the amount of the intake air in each cylinder of the first cylinder bank 1a is greater than the amount of the intake air in each cylinder of the second cylinder bank 1b. However, needless to say, it is possible to increase the intake air amount in each cylinder of the second cylinder bank 1b exceeding the intake air amount in each cylinder of the first cylinder bank 1a.

Also, as a method for differentiating the intake air amount of the first cylinder bank 1a from the intake air amount of the second cylinder bank 1b, it is possible to provide sub-throttle valves instead of the first and second idle speed control valves 34 and 35 in the first intake pipe 36 and the second intake pipe 37.

Embodiment 5

An exhaust gas purifying apparatus for an internal combustion engine in accordance with fifth embodiment of the present invention will now be described with reference to the drawings. In this case, only a structure which is different from the fourth embodiment will be described.

Figure 14:
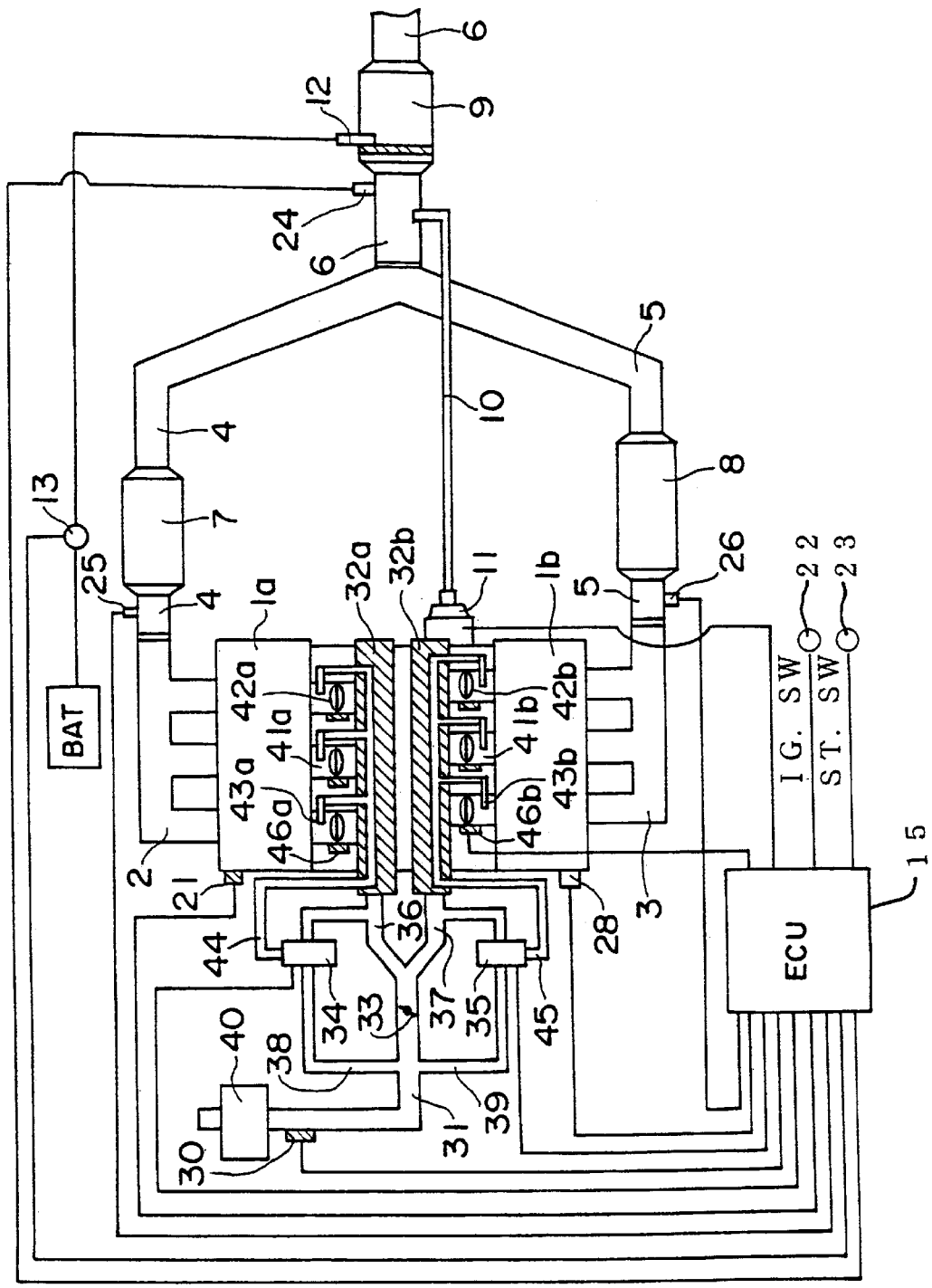
FIG. 14 is a schematic view showing a structure of an internal combustion engine and an exhaust system to which an exhaust gas purifying apparatus according to an embodiment 5 is applied.

FIG. 14 is a view showing a schematic structure of an internal combustion engine 1 to which the exhaust gas purifying apparatus for an internal combustion engine in accordance with this embodiment is applied and an exhaust system thereof.

A first cylinder bank side surge tank 32a is connected to an intake port of each cylinder of the first cylinder bank 1a through an intake manifold 41a. An intake flow control valve 42a for opening/closing a flow path within the intake manifold 41a is mounted in each branch pipe of the intake manifold 41a. An air assist nozzle 43a for injecting fresh air, flowing downstream of the air cleaner 40, into the intake manifold 41a is mounted in the intake manifold 41a downstream of the intake flow control valve 42a.

The above-described intake flow control valve 42a may be switched over among a fully open condition, a half-open condition and fully closed condition by an actuator 46a. The actuator 46a switches the open/closed conditions of the above-described intake flow control valve 42a in response to a control signal from the ECU 15.

Each air assist nozzle 43a on the side of the first cylinder bank 1a is connected to an idle speed control valve 34 through an air delivery pipe 44. In this case, the idle speed control valve 34 in accordance with this embodiment is formed by a three-way valve for switching the flow paths so that the fresh air introduced from the intake pipe 31 upstream of the throttle valve 33 is caused to flow into either air delivery pipe 44 or first intake pipe 36.

Subsequently, a second surge tank 32b on the second cylinder bank side is connected to an intake port of each cylinder of the second cylinder bank 1b through an intake manifold 41b. Then, in the same way as in the first cylinder bank side, an intake flow control valve 42b and an air assist nozzle 43b are mounted in each branch pipe of the intake manifold 41b. The above-described intake flow control valve 42b is switched over among a fully open condition, a half-open condition and fully closed condition by an actuator 46b.

Then, each air assist nozzle 43b on the side of the second cylinder bank 1b is connected to an idle speed control valve 35 through an air delivery pipe 45. In the same manner as in the above-described idle speed control valve 34, the idle speed control valve 35 is also formed by a three-way valve for switching the flow paths so that the fresh air introduced from the intake pipe 31 upstream of the throttle valve 33 is caused to flow into either air delivery pipe 45 or second intake pipe 37.

Subsequently, the ECU 15 is connected to various sensors (not shown) in addition to an ignition switch sensor (IGSW) 22, a starter switch sensor (STSW) 23, the air/fuel sensors 25 and 26, the oxygen sensor 24, the crank angle sensor 21, a water temperature sensor 28 and the air flow meter 30 and calculates an electric application timing of the heater 12, a secondary air feeding amount, a secondary air feeding timing, a fuel injection amount, a fuel injection timing, an ignition timing, an opening degree and a flow path of the first and second idle speed control valves 34 and 35, an opening degree of the intake flow control valves of each cylinder banks 1a, 1b or the like, to control the relay 13, the air pump 11, the first and second idle speed control valves 34 and 35, the actuators 46a and 46b and the like in accordance with the signals from the respective sensors.

For example, in the starting operation of the internal combustion engine 1, the ECU 15 feeds control signals to the actuators 46a and 46b, brings all the intake control valves 42a and 42b of the first cylinder bank 1a and the second cylinder bank 1b into the fully closed condition, and at the same time switches the flow paths of the idle speed control valves 34 and 35 to the air delivery pipes 44 and 45.

Under such a condition, when the starting operation of the internal combustion engine 1 (that is, the cranking is started) and the intake valve of each cylinder is opened, the vacuum pressure is generated downstream of the intake flow control valves 42a and 42b by the downward movement of the piston within each cylinder. In this case, fresh air is injected from the air assist nozzles 43a and 43b, the fresh air is strongly sucked into the combustion engine of each cylinder. As a result of the high speed fresh air flow, the fuel injected from the injection valve (not shown) is strongly diffused to thereby produce a mist-like good mixture.

Furthermore, the ECU 15 in accordance with this embodiment controls the actuators 46a and 46b so that the intake air flow control valves 42a on the side of the first cylinder bank 1a are kept in the half-open condition in the warming-up operation after the completion of the starting operation of the internal combustion engine 1 whereas the intake flow control valves 42b on the side of the second cylinder bank 1b are kept under the fully closed condition. In this case, the fresh air that flows within the intake manifold 41a on the side of the first cylinder bank 1a interferes with the intake flow control valves 42a kept under the half-open condition to produce turbulence and flow into the combustion chambers. Then, in each cylinder of the first cylinder bank 1a, since the combustion speed is enhanced by the above-described turbulence, the time period for combustion is shortened in comparison with each cylinder of the second cylinder bank 1b.

As a result, a time which is taken from the completion of the combustion in each cylinder of the first cylinder bank 1a till the exhaust valve is opened is longer than a time which is taken from the completion of the combustion in each cylinder of the second cylinder bank 1b till the exhaust valve is opened. Corresponding to this, the temperature of the combustion gas within the combustion chamber is lowered. The temperature of the exhaust gas from each cylinder of the first cylinder bank 1a is lower than the temperature of the exhaust gas from each cylinder of the second cylinder bank 1b.

<Operation and Advantage of Fifth Embodiment>

The operation and advantage of the exhaust gas purifying apparatus for an internal combustion engine in accordance with the embodiment will now be described.

When the electric signal representative of the ON condition of the ignition switch is inputted into the ECU 15 by the ignition switch sensor 22 in the starting operation for the internal combustion engine 1, the ECU 15 switches the relay 13 from the OFF condition to the ON condition and applies the current from the battery 14 to the heater 12 of the third three way catalyst 9. Then, the ECU 15 feeds the control signals to the actuators 46a and 46b, brings all the intake flow control valves 42a and 42b of the first cylinder bank 1a and the second cylinder bank 1b into the fully closed condition, and at the same time switches the flow paths of the idle speed control valves 34 and 35 to the side of the air delivery pipes 44 and 45. Subsequently, when an electric signal representative of the ON condition of the starter switch is inputted into the ECU 15 by the starter switch sensor 23, the ECU 15 feeds a drive current to the air pump 11, pressurizes and feeds the fresh air, flowing through the intake flow passage downstream of the air cleaner, to the exhaust pipe 6 and causes the air/fuel ratio of the exhaust gas introduced into the third three way catalyst 9 to be close to the stoichiometric air/fuel ratio.

Subsequently, when the starting operation of the internal combustion engine 1 is completed, the ECU 15 switches the flow paths of the idle speed control valves 34 and 35 from the side of the air delivery pipes 44 and 45 to the side of the first intake pipe 36 and the second intake pipe 37. Then, the ECU 15 calculates a target RPM from a loading condition of a compressor for an air conditioner, an output signal from the water temperature sensor 28 or the like, and calculates the target RPM of the internal combustion engine 1 on the basis of the output signal from the crank angle sensor 21.

Subsequently, the ECU 15 compares the outputted target RPM with the engine RPM and performs the feedback control of the first and second idle speed control valves 34 and 35 so that the actual engine RPM is identified with the target RPM. In this case, the ECU 15 controls the first and second idle speed control valves 34 and 35 so that the opening degree of the first idle speed control valve 34 on the side of the first cylinder bank 1a is equal to the opening degree of the second idle speed control valve 35 on the side of the second cylinder bank 1b.

Furthermore, the ECU 15 controls the actuator 46a so that the intake flow control valves 42a on the side of the first cylinder bank 1a are kept under the half-open condition, and at the same time, controls the actuator 46b so that the intake flow control valves 42b on the side of the second cylinder bank 1b are kept under the half-open condition.

In this case, the fresh air flowing trough the intake manifold 41a on the side of the first cylinder bank 1a is introduced into the combustion chambers while interfering with the intake flow control valves 42a kept under the half-open condition to produce the turbulence, whereas the fresh air flowing through the intake manifold 41b on the second cylinder bank 1b hardly interferes with the intake flow control valves 42b kept under the fully closed condition and is introduced into the combustion chambers without any turbulence. For this reason, the combustion speed of each cylinder of the first cylinder bank 1a is higher than the combustion speed of each cylinder of the second cylinder bank 1b.

Then, in the opening state of the exhaust valves, the combustion gas temperature within each cylinder of the first cylinder bank 1a is lower than the combustion gas temperature within each cylinder of the second cylinder bank 1b. The temperature of the exhaust gas discharged from each cylinder of the first cylinder bank 1a is lower than each cylinder of the second cylinder bank 1b.

The exhaust gas thus discharged from the internal combustion engine 1 is introduced into the first and second exhaust manifolds 2 and 3 and then introduced into the first and second three way catalysts 7 and 8 through the first and second exhaust pipes 4 and 5. Then, the temperature of the first and second three way catalysts 7 and 8 is elevated by the heat of the exhaust gas. However, since the temperature of the exhaust gas from the second cylinder bank 1b is higher than the temperature of the exhaust gas from the first cylinder bank 1a, the exhaust gas which has a higher temperature than that of the first three way catalyst 7 is introduced into the second three way catalyst 8. As a result, the second three way catalyst 8 reaches the predetermined temperature earlier than the first three way catalyst 7 and releases the adsorbed unburnt hydrocarbon (HC).

Accordingly, in accordance with the embodiment, it is possible to differentiate the timing for desorbing the unburnt hydrocarbon (HC) by the first three way catalyst 7 from the timing for unburnt hydrocarbon (HC) by the second three way catalyst 8 to avoid the introduction of all the unburnt hydrocarbon (HC) adsorbed to the first three way catalyst 7 and the second three way catalyst 8 into the third three way catalyst 9. Accordingly, it is possible to suppress the capacity increase of the third three way catalyst and the enlargement of the heater 12 by the capacity increase.

Incidentally, there is described an example in which the intake flow control valves 42a on the side of the first cylinder bank 1a are kept in the half-open condition and at the same time the intake flow control valves 42b on the side of the second cylinder bank 1b are kept under the fully open condition. However, needless to say, it is possible to take a reverse arrangement that the intake flow control valves 42b on the side of the second cylinder bank 1b are kept in the half-open condition and at the same time the intake flow control valves 42a on the side of the first cylinder bank 1a are kept under the fully closed condition.

Embodiment 6

An exhaust gas purifying apparatus for an internal combustion engine in accordance with a sixth embodiment of the present invention will now be described with reference to the drawings. In this case, only a structure which is different from the first embodiment will be described.

Figure 15:
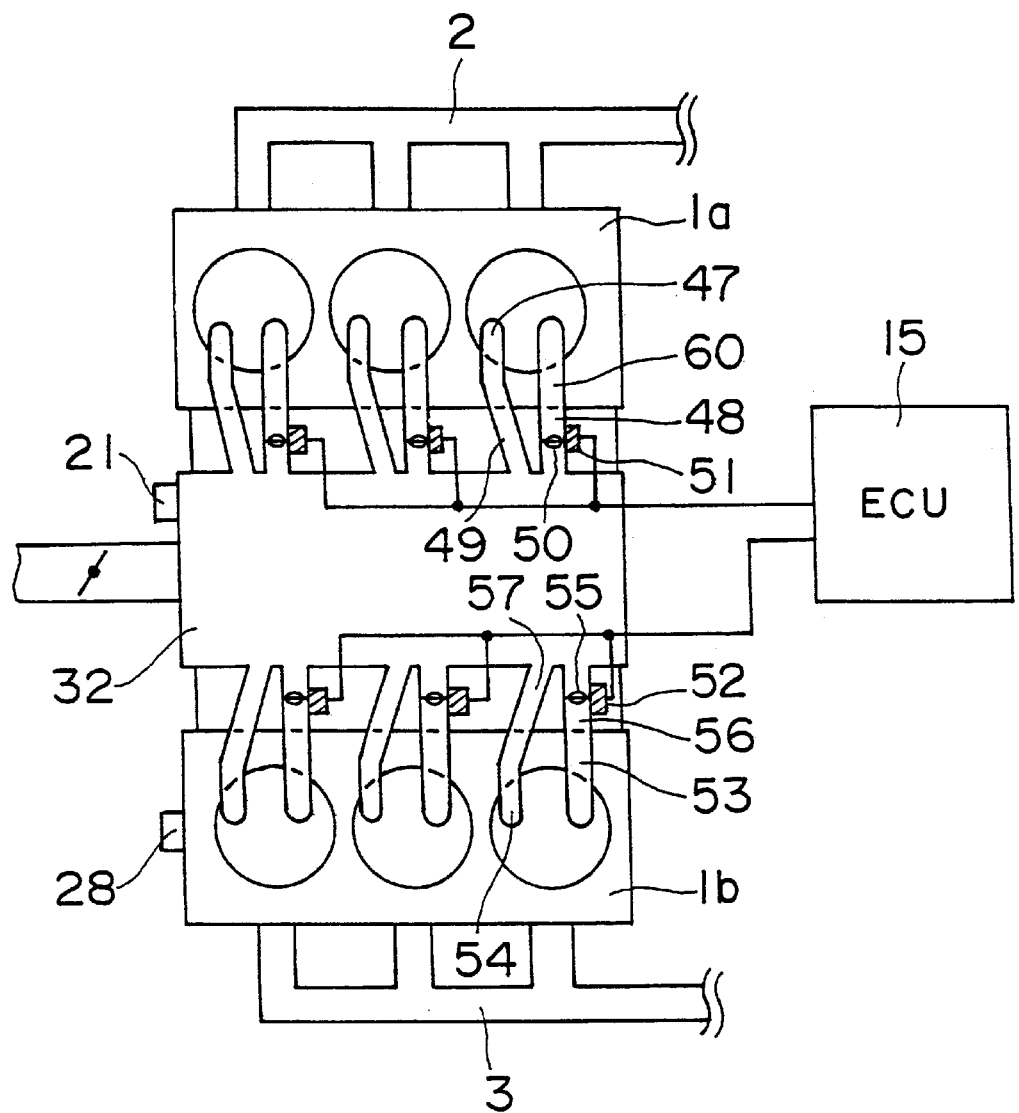
FIG. 15 is a schematic view showing a structure of an internal combustion engine and an exhaust system to which an exhaust gas purifying apparatus according to an embodiment 6 is applied.

FIG. 15 is a view showing a schematic structure of an internal combustion engine 1 only to which the exhaust gas purifying apparatus for an internal combustion engine in accordance with this embodiment is applied. The exhaust system thereof is not shown in FIG. 15 but contains the elements as shown in FIG. 14 and described below.

In this embodiment, the distance from the first three way catalyst 7 to the exhaust port of the first cylinder bank 1a is the same as the distance from the second three way catalyst 8 to the exhaust port of the second cylinder bank 1b.

Then, each cylinder of the first cylinder bank 1a of the internal combustion engine 1 is provided with a straight port 60 having a straight flow path from an opening portion formed in an outer wall of a cylinder head toward an opening portion formed in the combustion chamber and a helical port 47 having a flow path swirled from an opening portion of the outer wall of the cylinder head toward an opening portion formed in the combustion chamber.

The straight port 60 of each cylinder of the first cylinder bank 1a is connected to a surge tank 32 through a first straight port side intake manifold 48, and the helical port 47 of each cylinder is connected to the surge tank 32 through the first helical port side intake manifold 49. Then, a first swirl control valve 50 for opening/closing a flow path within the pipe is provided in the first straight port side intake manifold 48 and is driven by an actuator 51.

On the other hand, in the same way as for the first cylinder bank 1a, each cylinder of the second cylinder bank 1b of the internal combustion engine is provided with a straight port 53 and a helical port 54. The straight port 53 is connected to the surge tank 32 through a second straight port side intake manifold 56, and the helical port 54 is connected to the surge tank 32 through the second helical port side intake manifold 57. Then, a second swirl control valve 55 is provided in the first straight port side intake manifold 56 and is driven by an actuator 52.

Subsequently, the ECU 15 is connected to various sensors such as the crank angle sensor 21, a water temperature sensor 28 or the like and calculates an electric application timing of the heater 12, a secondary air feeding amount, a secondary air feeding timing, a fuel injection amount, a fuel injection timing, an ignition timing, an opening degree of the first and second swirl control valves 55 and 56 or the like, to control the relay 13, the air pump 11, the actuators 51 and 52 or the like in accordance with the signals from the respective sensors.

Then, in the warming-up operation after the completion of the starting operation of the internal combustion engine 1, the ECU 15 in accordance with this embodiment controls the actuators 51 and 52 so that the first swirl control valve 50 on the side of the first cylinder bank 1a is closed and the second swirl control valve 55 on the side of the second cylinder bank 1b is opened.

In this case, the fresh air or mixture is introduced only from the helical port 47 into the combustion chamber of each cylinder of the first cylinder bank 1a to generate a strong swirl flow within the combustion chamber. The flame propagation of each cylinder of the first cylinder bank 1a is accelerated by the swirl flow to enhance the combustion speed.

On the other hand, the fresh air or mixture is introduced from both the helical portion 54 and the straight port 53 into the combustion chamber of each cylinder of the second cylinder bank 1b so that a strong swirl is not generated in the combustion chamber. As a result, in each cylinder of the second cylinder bank 1b, the flame propagation is not accelerated like the first cylinder bank 1a. Accordingly, the combustion speed of each cylinder of the second cylinder bank 1b is slower than that of each cylinder of the first cylinder bank 1a.

Accordingly, in the opening state of the exhaust valves, the combustion gas temperature within each cylinder of the first cylinder bank 1a is lower than the combustion gas temperature within each cylinder of the second cylinder bank 1b. The temperature of the exhaust gas discharged from each cylinder of the second cylinder bank 1b is higher than the each cylinder of the first cylinder bank 1a.

The exhaust gas thus discharged from the internal combustion engine 1 is introduced into the first and second exhaust manifold 2 and 3 and then introduced into the first and second three way catalysts 7 and 8 through the first and second exhaust pipes 4 and 5. In this case, the temperature of the first and second three way catalysts 7 and 8 is elevated by the heat of the exhaust gas. However, since the temperature of the exhaust gas from the second cylinder bank 1b is higher than the temperature of the exhaust gas from the first cylinder bank 1a, the exhaust gas which has a higher temperature than that of the first three way catalyst 7 is introduced into the second three way catalyst 8. As a result, the second three way catalyst 8 reaches the predetermined temperature earlier than the first three way catalyst 7 and releases the adsorbed unburnt hydrocarbon (HC).

Accordingly, in accordance with the embodiment, it is possible to differentiate the timing for desorbing the unburnt hydrocarbon (HC) by the first three way catalyst 7 from the timing for unburnt hydrocarbon (HC) by the second three way catalyst 8 to avoid the introduction of all the unburnt hydrocarbon (HC) adsorbed to the first three way catalyst 7 and the second three way catalyst 8 into the third three way catalyst 9. Accordingly, it is possible to suppress the capacity increase of the third three way catalyst 9 and the enlargement of the heater 12 by the capacity increase.

Embodiment 7

An exhaust gas purifying apparatus for an internal combustion engine in accordance with a seventh embodiment of the present invention will now be described with reference to the drawings. In this case, only a structure which is different from the first embodiment will be described.

Figure 16:
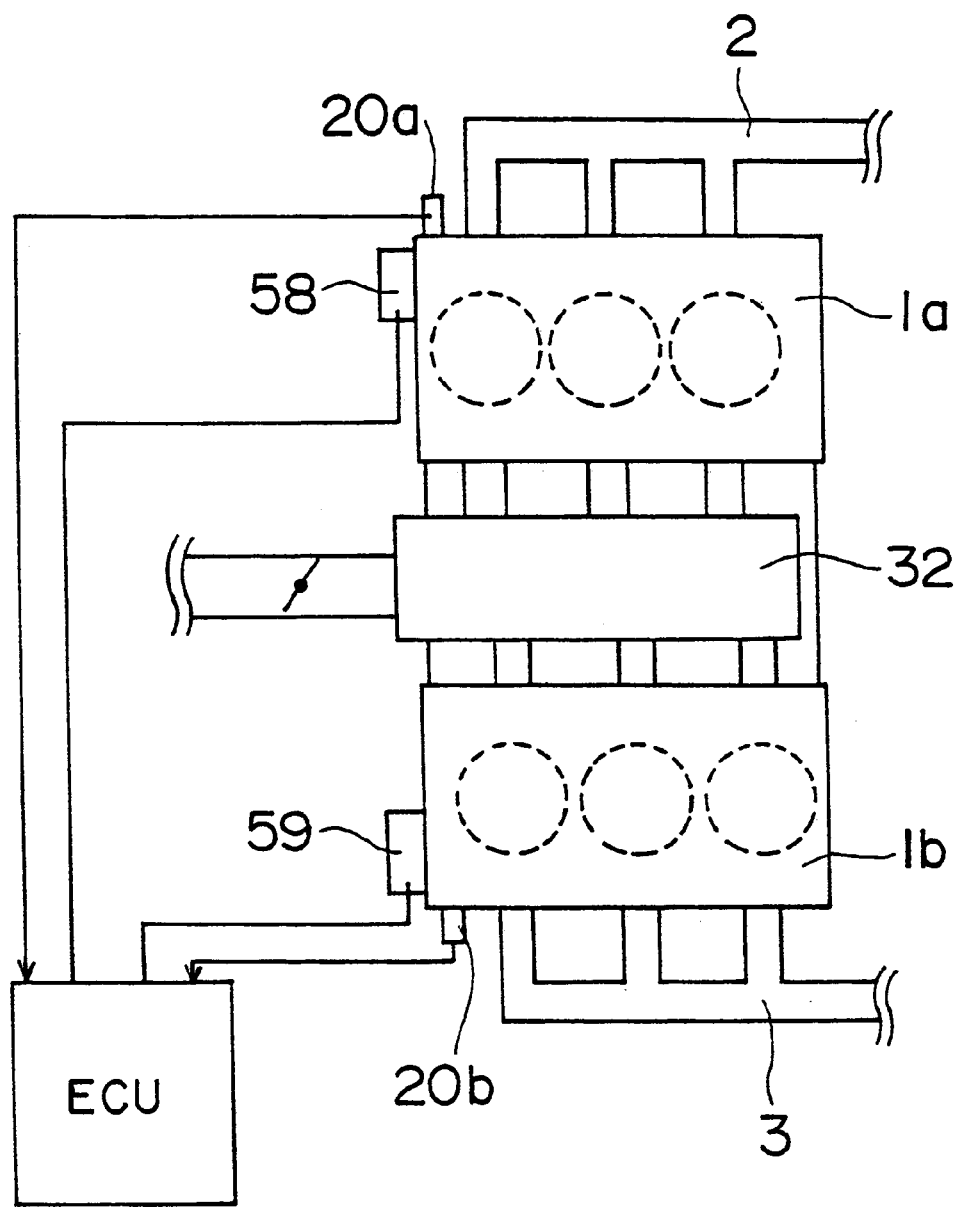
FIG. 16 is a schematic view showing a structure of an internal combustion engine and an exhaust system to which an exhaust gas purifying apparatus according to an embodiment 7 is applied.

FIG. 16 is a view showing a schematic structure of an internal combustion engine 1 to which the exhaust gas purifying apparatus for an internal combustion engine in accordance with this embodiment is applied. The exhaust system thereof is essentially as shown in FIG. 14.

In this embodiment, the distance from the first three way catalyst 7 to the exhaust port of the first cylinder bank 1a is the same as the distance from the second three way catalyst 8 to the exhaust port of the second cylinder bank 1b.

Then, each cylinder of the first cylinder bank 1a of the internal combustion engine 1 is provided with a first variable valve timing mechanism 58 for changing a rotational phase of a cam shaft (not shown) for driving an exhaust valve of each cylinder, and each cylinder of the second cylinder bank 1b of the internal combustion engine 1 is provided with a second variable valve timing mechanism 59 for changing a rotational phase of the cam shaft (not shown) for driving an exhaust valve of each cylinder. These first and second valve timing mechanisms 58 and 59 change the phases of the cam shafts in accordance with control signals from the ECU 15.

Subsequently, a cam position sensor 20a for detecting a rotational position of the cam shaft on the exhaust valve side is mounted on the first cylinder bank 1a, and a cam position sensor 20b for detecting a rotational position of the cam shaft on the exhaust valve side is mounted on the second cylinder bank 1b.

Next, the ECU 15 calculates an optimum opening/closing timing (target valve timing) for each exhaust valve in response to the operational conditions such as an engine RPM, an intake air amount or the like of the internal combustion engine 1, simultaneously calculates an actual opening/closing timing (actual valve timing) in accordance with output signals of the cam position sensors 20a and 20b and controls the first and second variable valve timing mechanisms 58 and 59 so that the actual valve timing is identified with the target valve timing.

Furthermore, the ECU 15 in accordance with this embodiment controls the first and second variable valve timing mechanisms 58 and 59 so that the opening timing of the exhaust valve of the first cylinder bank 1a is earlier than the opening timing of the exhaust valve of the second cylinder bank 1b in the warming-up operation after the completion of the starting operation of the internal combustion engine 1. In this case, in the opening state of the exhaust valves of the exhaust valves of the first cylinder bank 1a, the combustion gas temperature within each cylinder of the first cylinder bank 1a is higher than the combustion gas temperature within each cylinder of the second cylinder bank 1b when the opening state of the exhaust of the second cylinder bank 1boccurs later. Accordingly, the temperature of the exhaust gas discharged from each cylinder of the first cylinder bank 1a is higher than the exhaust temperature of each cylinder of the second cylinder bank 1b.

The exhaust gas thus discharged from the internal combustion engine 1 is introduced into the first and second exhaust manifold 2 and 3 and then introduced into the first and second three way catalysts 7 and 8 through the first and second exhaust pipes 4 and 5. In this case, the temperature of the first and second three way catalysts 7 and 8 is elevated by the heat of the exhaust gas. However, since the temperature of the exhaust gas from the first cylinder bank 1a is higher than the temperature of the exhaust gas from the second cylinder bank 1b, the exhaust gas which has a higher temperature than that of the second three way catalyst 8 is introduced into the first three way catalyst 7. As a result, the first three way catalyst 7 reaches the predetermined temperature earlier than the second three way catalyst 8 and releases the adsorbed unburnt hydrocarbon (HC).

Accordingly, in accordance with the embodiment, it is possible to differentiate the timing for desorbing the unburnt hydrocarbon (HC) by the first three way catalyst 7 from the timing for unburnt hydrocarbon (HC) by the second three way catalyst 8 to avoid the introduction of all the unburnt hydrocarbon (HC) adsorbed to the first three way catalyst 7 and the second three way catalyst 8 into the third three way catalyst 9. Accordingly, it is possible to suppress the capacity increase of the third three way catalyst 9 and the enlargement of the heater 12 by the capacity increase.

Embodiment 8

An exhaust gas purifying apparatus for an internal combustion engine in accordance with an eighth embodiment of the present invention will now be described. In this case, only a structure which is different from the first embodiment will be described.

In this embodiment, the distance from the first three way catalyst 7 to the exhaust port of the first cylinder bank 1a is the same as the distance from the second three way catalyst 8 to the exhaust port of the second cylinder bank 1b. Then, the first exhaust manifold 2 is made of stainless steel and the second exhaust manifold 3 is made of cast iron. In this case, since the stainless steel has a thermal capacity which is higher than that of the cast iron, the thermal capacity of the first exhaust manifold 2 is greater than that of the second exhaust manifold 3.

The thus constructed first and second exhaust manifolds 2 and 3 adsorb the heat of the exhaust gas discharged from the internal combustion engine 1 but the thermal capacity of the first exhaust manifold 2 is greater than that of the second exhaust manifold 3. Accordingly, the first exhaust manifold 2 more deprives the exhaust gas of the heat than the second exhaust manifold 3.

Then, the temperature of the exhaust gas flowing through the first exhaust manifold 2 is lower than the temperature of the exhaust gas flowing through the second exhaust manifold 3. The temperature of the exhaust gas introduced into the first three way catalyst 7 is lower than the temperature of the exhaust gas introduced into the second three way catalyst 8. As a result, the second three way catalyst 8 is exposed in the exhaust gas having a higher temperature than that of the first three way catalyst 7 and reaches the predetermined temperature earlier than the first three way catalyst 7. Thus, the first exhaust manifold 2 and the second exhaust manifold 3 realize a desorption/adjustment means in accordance with the present invention.

Accordingly, in accordance with the embodiment, it is possible to differentiate the timing for desorbing the unburnt hydrocarbon (HC) by the first three way catalyst 7 from the timing for unburnt hydrocarbon (HC) by the second three way catalyst 8 to avoid the introduction of all the unburnt hydrocarbon (HC) adsorbed to the first three way catalyst 7 and the second three way catalyst 8 into the third three way catalyst 9. Accordingly, it is possible to suppress the capacity increase of the third three way catalyst and the enlargement of the heater 12 by the capacity increase.

Embodiment 9

An exhaust gas purifying apparatus for an internal combustion engine in accordance with a ninth embodiment of the present invention will now be described. In this case, only a structure which is different from the first embodiment will be described.

The first three way catalyst 7 and the second three way catalyst 8 are formed by filling cylindrical outer sleeves with monolithic catalysts having through holes in the flow direction of the exhaust gas. In this case, the number of the through holes per unit area of the first three way catalyst 7 is greater than the number of the through holes per unit area of the second three way catalyst 8.

In this case, since the density of the through holes per unit area of the first three way catalyst 7 is greater than the density of the through holes per unit area of the second three way catalyst 8, the heat capacity of the first three way catalyst 7 is greater than the heat capacity of the second three way catalyst 8. Thus, the above-described first and second three way catalysts 7 and 8 realize the desorption/adjustment means according to the present invention.

Then, when the internal combustion engine 1 is started, the above-described first and second three way catalysts 7 and 8 receive the heat of the exhaust gas discharged from the internal combustion engine 1 with their temperature being elevated. However, since the heat capacity of the second three way catalyst 8 is smaller than the heat capacity of the first three way catalyst 7, the temperature elevation rate of the second three way catalyst 8 is higher than the temperature elevation rate of the first three way catalyst 7 and the temperature of the first three way catalyst 7 is elevated to the predetermined temperature earlier than that of the first three way catalyst 8 to release the adsorbed unburnt hydrocarbon (HC).

Figure 17:
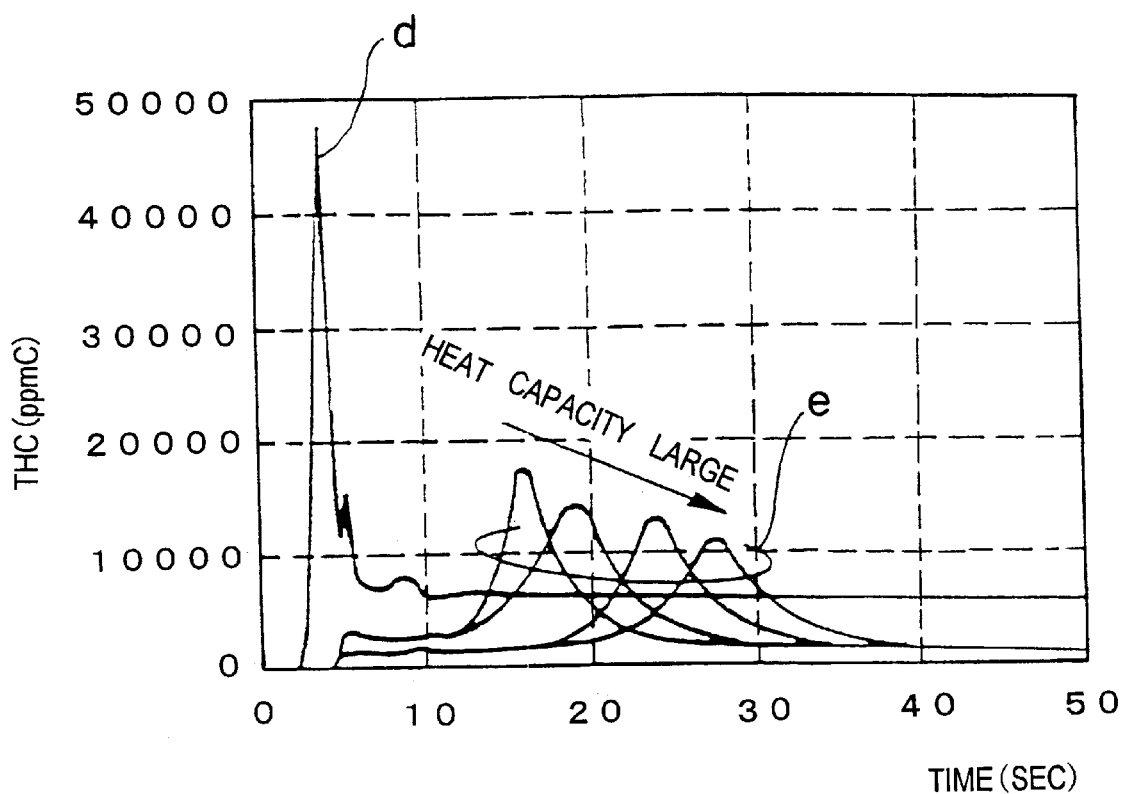
FIG. 17 is a view showing a relationship between a heat capacity of the three way catalyst and a desorption timing of the unburnt hydrocarbon.

A relationship between the heat capacity of the three way catalyst and the desorption timing will now be described with reference to FIG. 17. A curve d in FIG. 17 shows a result of the measurement of the HC concentration in the exhaust gas upstream of the first three way catalyst 7 or the second three way catalyst 8. It is understood that a large amount of HC exists in the exhaust gas in the starting operation of the internal combustion engine 1.

Subsequently, curves e in FIG. 17 show results of the measurement of the HC concentration in the exhaust gas downstream of the three way catalysts having four different capacities. It is understood that the greater the heat capacity of the three way catalyst, the slower the desorption timing of the unburnt hydrocarbon (HC) will become.

Thus, the three way catalysts which have different heat capacities are utilized so that the timings of desorption of the unburnt hydrocarbon (HC) by the respective three way catalysts may be differentiated from each other.

Accordingly, in accordance with the embodiment, it is possible to differentiate the heat capacity of the first three way catalyst 7 from the heat capacity of the second three way catalyst 8 to differentiate the timing for desorbing the unburnt hydrocarbon (HC) by the first three way catalyst 7 from the timing for unburnt hydrocarbon (HC) to avoid the introduction of all the unburnt hydrocarbon (HC) adsorbed to the first three way catalyst 7 and the second three way catalyst 8 into the third three way catalyst 9. Accordingly, it is possible to suppress the capacity increase of the third three way catalyst and the enlargement of the heater 12 by the capacity increase.

Incidentally, as a method for differentiating the heat capacities of the first three way catalyst 7 and the second three way catalyst 8, it is possible to differentiate a thickness of a ceramic carrier constituting the first three way catalyst 7 from a thickness of a ceramic carrier constituting the second three way catalyst 8. For example, in the case where the thickness of the ceramic carrier of the first three way catalyst 7 is greater than the thickness of the ceramic carrier of the second three way catalyst 8, the heat capacity of the first three way catalyst 7 is greater than the heat capacity of the second three way catalyst 8.

Also, it is possible to differentiate a thickness of an alumina coat constituting a catalyst layer of the first three way catalyst 7 from a thickness of an alumina coat constituting a catalyst layer of the second three way catalyst 8. For example, in the case where the thickness of the alumina coat of the first three way catalyst 7 is greater than the thickness of the alumina coat of the second three way catalyst 8, the heat capacity of the first three way catalyst 7 is greater than the heat capacity of the second three way catalyst 8.

Furthermore, it is possible to differentiate an amount of a catalyst substance carried on an alumina coat of the first three way catalyst 7 from an amount of a catalyst substance carried on an alumina coat of the second three way catalyst 8. For example, in the case where the heat capacity of the catalyst substance of the first three way catalyst 7 is greater than the heat capacity of the catalyst substance of the second three way catalyst 8, the heat capacity of the first three way catalyst 7 is greater than the heat capacity of the second three way catalyst 8.

Also, it is possible to differentiate a capacity of the first three way catalyst 7 from a capacity of the second three way catalyst 8. For example, in the case where the capacity of the first three way catalyst 7 is greater than the capacity of the second three way catalyst 8, the heat capacity of the first three way catalyst 7 is greater than the heat capacity of the second three way catalyst 8.

Furthermore, it is possible to form the carrier of the first three way catalyst 7 and the carrier of the second three way catalyst 8 of different material. For example, in the case where the carrier of the first three way catalyst 7 is made of metal and the carrier of the second three way catalyst 8 is made of ceramic, since the heat capacity of the metal is greater than the capacity of the ceramic, the heat capacity of the first three way catalyst 7 is greater than the heat capacity of the second three way catalyst 8.

Also, it is possible to differentiate a thickness of an outer sleeve constituting the first three way catalyst 7 from a thickness of an outer sleeve constituting the second three way catalyst 8. For example, in the case where the thickness of the outer sleeve of the first three way catalyst 7 is greater than the thickness of the outer sleeve of the second three way catalyst 8, the heat capacity of the first three way catalyst 7 is greater than the heat capacity of the second three way catalyst 8.

Subsequently, it is possible to exemplify a method for differentiating heat transfer properties of both of the first three way catalyst 7 and the second three way catalyst 8 as a method for differentiating the desorption timings of the first three way catalyst 7 and the second three way catalyst 8. For example, in the case where the capacities of the first three way catalyst 7 and the second three way catalyst 8 are kept at the same level and the first three way catalyst 7 is thicker and shorter than the second three way catalyst, it is difficult to transfer the heat of the end portion on the downstream side in the second three way catalyst 8 than in the first three way catalyst 7, and it takes a long time to elevate the temperature up to the predetermined temperature. As a result, the first three way catalyst 7 reaches the predetermined temperature earlier than the second three way catalyst 8 and desorbs the adsorbed unburnt hydrocarbon (HC).

Figure 18:
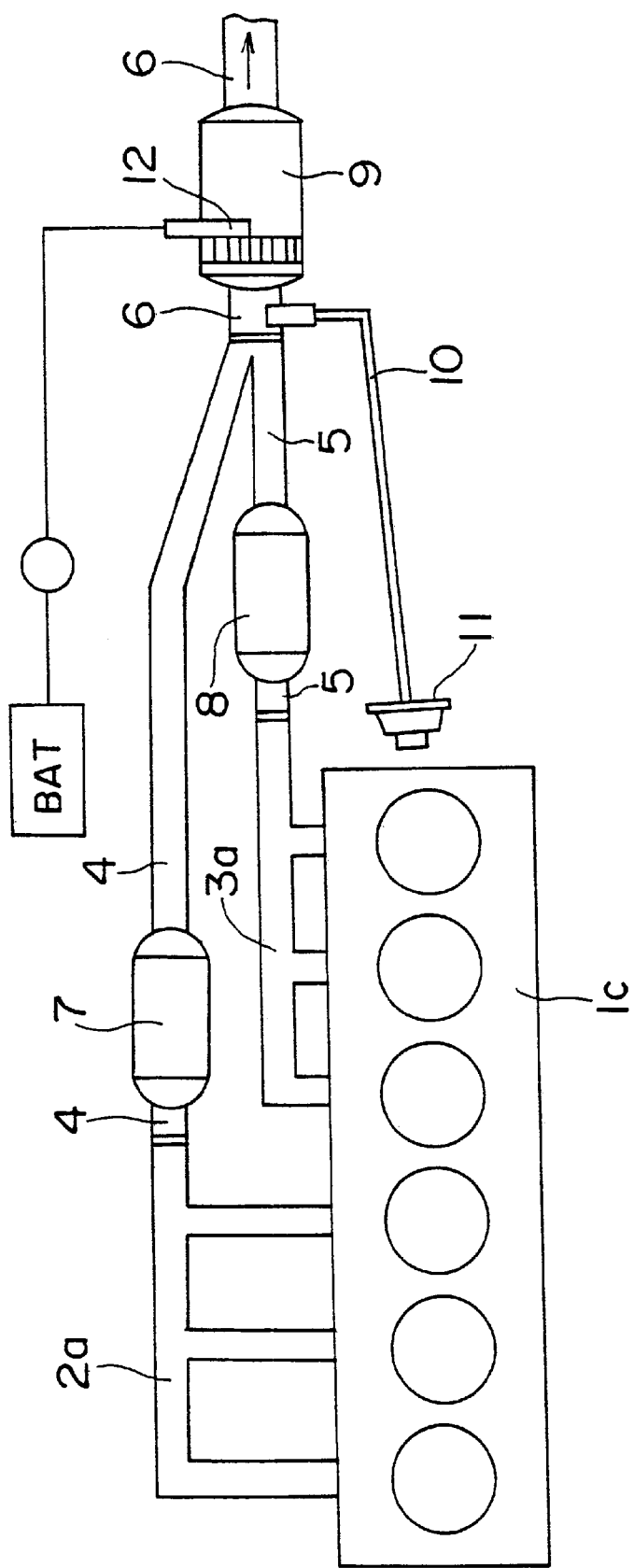
FIG. 18 is a view showing another embodiment of an internal combustion engine to which an exhaust gas purifying apparatus according to the present invention is applied.

In the foregoing first to ninth embodiments, the exhaust gas purifying apparatus for an internal combustion engine according to the present invention is applied to a V-type multi-cylinder internal combustion engine. However, it may be applied to a straight type multi-cylinder internal combustion engine. For example, as shown in FIG. 18, in case of the straight six cylinder internal combustion engine, a first exhaust manifold 2a is connected to first through third cylinders and a second exhaust manifold 2b is connected to fourth through sixth cylinders. Subsequently, in a dual structure exhaust pipe in which the first cylinder 4 is connected to the above-described first exhaust manifold 2a, and the second exhaust pipe 5 is connected to the above-described exhaust manifold 2b, it is possible to differentiate a timing for desorbing the unburnt hydrocarbon (HC) by the first three way catalyst 7 provided in the above-described first exhaust pipe 4 from the timing for desorbing the unburnt hydrocarbon (HC) by the second three way catalyst 8 provided in the above-described second exhaust pipe 5.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. An exhaust gas purifying apparatus for an internal combustion engine, comprising:

a plurality of exhaust passages connected to a multi-cylinder internal combustion engine;

a joint exhaust passage formed by merging said exhaust passages;

exhaust gas purifying means for purifying exhaust gas that flows through said joint exhaust passage;

adsorption/desorption means provided in each of said exhaust passages for adsorbing an unburnt gas component contained in the exhaust gas that flows through each of said exhaust passages at a temperature lower than a predetermined temperature and for desorbing the adsorbed unburnt gas component at a temperature equal to or higher than the predetermined temperature; and desorption/adjustment means for differentiating timings for the unburnt gas components, which have been desorbed from the respective adsorption/desorption means, to enter into the exhaust gas purifying means, wherein said desorption/adjustment means differentiates timings of each of said adsorption/desorption means to desorb the unburnt gas components therefrom.

2. The exhaust gas purifying apparatus for an internal combustion engine according to claim 1, wherein said adsorption/desorption means comprises a three way catalyst.

3. The exhaust gas purifying apparatus for an internal combustion engine according to claim 1, wherein said desorption/adjustment means differentiates exhaust temperature introduced in said adsorption/desorption means of each of said exhaust passages.

4. The exhaust gas purifying apparatus for an internal combustion engine according to claim 3, wherein said desorption/adjustment means differentiates distances between said adsorption/desorption means and the internal combustion engine for every adsorption/desorption means.

5. The exhaust gas purifying apparatus for an internal combustion engine according to claim 3, wherein said desorption/adjustment means differentiates ignition timings of cylinders to which the respective exhaust passages are connected, and differentiates temperatures of the exhaust gas flowing through the respective exhaust passages from the cylinders.

6. The exhaust gas purifying apparatus for an internal combustion engine according to claim 3, wherein said desorption/adjustment means differentiates air/fuel ratios of the mixture to be burnt in the cylinders to which the respective exhaust passages are connected, and differentiates temperatures of the exhaust gas flowing through the respective exhaust passages from the cylinders.

7. The exhaust gas purifying apparatus for an internal combustion engine according to claim 3, wherein said desorption/adjustment means differentiates intake air amounts of the cylinders to which the respective exhaust passages are connected, and differentiates exhaust amounts of the exhaust gas discharged from the cylinders for every exhaust passage.

8. The exhaust gas purifying apparatus for an internal combustion engine according to claim 3, wherein said desorption/adjustment means differentiates heat capacities of the respective exhaust passages.

9. The exhaust gas purifying apparatus for an internal combustion engine according to claim 1, wherein said desorption/adjustment means differentiates heat capacities of the respective adsorption/desorption means.

10. The exhaust gas purifying apparatus for an internal combustion engine according to claim 9, wherein each of said adsorption/desorption means comprises a carrier having a plurality of through holes in a direction of the flow of the exhaust gas, a catalyst layer formed on a surface of said carrier and an outer sleeve into which said carrier is provided; and wherein said desorption/adjustment means differentiates a thickness of a member constituting said carrier for each of said adsorption/desorption means.

11. The exhaust gas purifying apparatus for an internal combustion engine according to claim 9, wherein each of said adsorption/desorption means comprises a carrier having a plurality of through holes in a direction of the flow of the exhaust gas, a catalyst layer formed on a surface of said carrier and an outer sleeve into which said carrier is provided; and wherein said desorption/adjustment means differentiates a thickness of a member constituting said outer sleeve for each of said adsorption/desorption means.

12. The exhaust gas purifying apparatus for an internal combustion engine according to claim 9, wherein each of said adsorption/desorption means comprises a carrier having a plurality of through holes in a direction of the flow of the exhaust gas, a catalyst layer formed on a surface of said carrier and an outer sleeve into which said carrier is provided; and wherein said desorption/adjustment means differentiates a density of said through holes for each of said adsorption/desorption means.

13. The exhaust gas purifying apparatus for an internal combustion engine according to claim 9, wherein each of said adsorption/desorption means comprises a carrier having a plurality of through holes in a direction of the flow of the exhaust gas, a catalyst layer formed on a surface of said carrier and an outer sleeve into which said carrier is provided; and wherein said desorption/adjustment means differentiates a diameter of said carrier for each of said adsorption/desorption means.

14. The exhaust gas purifying apparatus for an internal combustion engine according to claim 9, wherein each of said adsorption/desorption means comprises a carrier having a plurality of through holes in a direction of the flow of the exhaust gas, a catalyst layer formed on a surface of said carrier and an outer sleeve into which said carrier is provided; and wherein said desorption/adjustment means differentiates a length in an axial direction of said carrier for each of said adsorption/desorption means.

15. The exhaust gas purifying apparatus for an internal combustion engine according to claim 9, wherein each of said adsorption/desorption means comprises a carrier having a plurality of through holes in a direction of the flow of the exhaust gas, a catalyst layer formed on a surface of said carrier and an outer sleeve into which said carrier is provided; and wherein said desorption/adjustment means differentiates a volume of said carrier for each of said adsorption/desorption means.

16. The exhaust gas purifying apparatus for an internal combustion engine according to claim 9, wherein each of said adsorption/desorption means comprises a carrier having a plurality of through holes in a direction of a flow of the exhaust gas, a catalyst layer formed to carry the catalyst material on a surface of the carrier and an outer sleeve into which said carrier is provided; and wherein said desorption/adjustment means differentiates a material of a member constituting said carrier for each of said adsorption/desorption means.

17. The exhaust gas purifying apparatus for an internal combustion engine according to claim 9, wherein each of said adsorption/desorption means comprises a carrier having a plurality of through holes in a direction of a flow of the exhaust gas, a catalyst layer formed to carry the catalyst material on a surface of the carrier and an outer sleeve into which said carrier is provided; and wherein said desorption/adjustment means differentiates an amount of the catalyst material for each of said adsorption/desorption means.

18. The exhaust gas purifying apparatus for an internal combustion engine according to claim 9, wherein each of said adsorption/desorption means comprises a carrier having a plurality of through holes in a direction of a flow of the exhaust gas, a catalyst layer formed to carry the catalyst material on a surface of the carrier and an outer sleeve into which said carrier is provided; and wherein said desorption/adjustment means differentiates an amount of said catalyst layer for each of said adsorption/desorption means.

19. The exhaust gas purifying apparatus for an internal combustion engine according to claim 1, wherein said internal combustion engine is a V-shaped internal combustion engine having a first cylinder bank and a second cylinder bank in which two or more cylinders are arranged in a straight line; and said exhaust passages are exhaust pipes connected to the respective cylinder banks.

20. The exhaust gas purifying apparatus for an internal combustion engine according to claim 1, wherein said exhaust passages are a dual exhaust pipe connected to the internal combustion engine.

21. The exhaust gas purifying apparatus for an internal combustion engine according to claim 1, wherein said exhaust gas purifying means comprises a heated catalyst.

22. The exhaust gas purifying apparatus for an internal combustion engine according to claim 1, wherein said exhaust gas purifying means comprises a three-way catalyst.

23. The exhaust gas purifying apparatus for an internal combustion engine according to claim 1, wherein said adsorption/desorption means comprises an adsorbent including a zeolite.

* * * * *

UNITED STATES PATENT AND TRADEMARK OFFICE
CERTIFICATE OF CORRECTION

PATENT NO.   : 6,151,890
DATED        : November 28, 2000
INVENTOR(S)  : Koichi Hoshi It is certified that error appears in the above-identified patent and that said Letters Patent is hereby corrected as shown below:

Title page,
Item [75], Inventor, "Koich Hoshi, Susono, Japan" should read -- Koichi Hoshi, Susono, Japan --.

Column 12,
Line 66, "upstream" should read -- downstream --.

Column 25,
Line 19, "fully closed" should read -- fully opened --.

Column 26,
Line 24, "half-open" should read -- fully opened --.
Line 32, "fully closed" should read -- fully opened --.

Column 27,
Line 14, "fully closed" should read -- fully opened --.

Signed and Sealed this

Fifteenth Day of April, 2003

JAMES E. ROGAN
*Director of the United States Patent and Trademark Office*